(12) United States Patent
Tavares et al.

(10) Patent No.: US 8,781,874 B2
(45) Date of Patent: Jul. 15, 2014

(54) NETWORK ANALYTICS SYSTEMS AND METHODS

(75) Inventors: Silvio Tavares, NE Atlanta, GA (US); Susan Fahy, Melville, NY (US); Dennis Carlson, NE Atlanta, GA (US)

(73) Assignee: First Data Corporation, Greenwood Village, CO (US)

( * ) Notice: Subject to any disclaimer, the term of this patent is extended or adjusted under 35 U.S.C. 154(b) by 316 days.

(21) Appl. No.: 13/408,482

(22) Filed: Feb. 29, 2012

(65) Prior Publication Data
US 2012/0215589 A1    Aug. 23, 2012

Related U.S. Application Data

(63) Continuation-in-part of application No. 13/314,988, filed on Dec. 8, 2011, now Pat. No. 8,306,846, which is a continuation-in-part of application No. 13/032,878, filed on Feb. 23, 2011, which is a continuation-in-part of application No. 12/758,397, filed on Apr. 12, 2010, now Pat. No. 8,195,500, application No. 13/408,482, which is a continuation-in-part of application No. 13/315,169, filed on Dec. 8, 2011, which is a continuation-in-part of application No. 13/032,878, filed on Feb. 23, 2011, which is a continuation-in-part of application No. 12/758,397, filed on Apr. 12, 2010, now Pat. No. 8,195,500.

(51) Int. Cl.
*G06Q 10/00* (2012.01)
*G06Q 30/02* (2012.01)
*G06Q 20/20* (2012.01)

(52) U.S. Cl.
CPC ........ *G06Q 30/0201* (2013.01); *G06Q 30/0202* (2013.01); *G06Q 20/20* (2013.01); *G06Q 20/202* (2013.01)
USPC .............. 705/7.29; 705/7.34; 705/21; 705/25

(58) Field of Classification Search
CPC ..................................................... G06Q 30/02
See application file for complete search history.

(56) References Cited

U.S. PATENT DOCUMENTS 5,500,513 A     3/1996  Langhans et al.
5,832,458 A *  11/1998  Jones .......................... 705/14.26
(Continued)

OTHER PUBLICATIONS

Ron Borzekowski, Elizabeth K. Kiser, The choice at the checkout: Quantifying demand across payment instruments, International Journal of Industrial Organization, vol. 26, Issue 4, Jul. 2008, pp. 889-902, ISSN 0167-7187.*

(Continued)

*Primary Examiner* — Gurkanwaljit Singh
(74) *Attorney, Agent, or Firm* — Kilpatrick Townsend & Stockton LLP

(57) ABSTRACT

In one method, a request is received for a market trend report corresponding to a designated payment type over a designated timeframe. A payment type dataset is identified from aggregated POS data. The payment type dataset comprises POS datasets corresponding to the timeframe and to transactions categorized by payment type. Market trend data is generated as a function of the payment type dataset and is output as a report. The method may produce a variety of reports. For example, a report may display the percentage of transactions for each payment type in terms of numbers of transactions. A report may further show whether each payment type is increasing or decreasing in numbers of transactions over the timeframe.

44 Claims, 23 Drawing Sheets

(56) References Cited

U.S. PATENT DOCUMENTS

| | | | |
|---|---|---|---|
| 6,078,891 A * | 6/2000 | Riordan et al. | 705/7.34 |
| 6,151,582 A | 11/2000 | Huang et al. | |
| 6,633,851 B1 | 10/2003 | Engler et al. | |
| 6,839,682 B1 * | 1/2005 | Blume et al. | 705/7.31 |
| 7,328,169 B2 * | 2/2008 | Temares et al. | 705/7.33 |
| 7,451,134 B2 | 11/2008 | Krakowiecki et al. | |
| 7,610,214 B1 | 10/2009 | Dwarakanath et al. | |
| 7,792,697 B2 * | 9/2010 | Bhagchandani et al. | 705/14.52 |
| 7,853,469 B2 | 12/2010 | Maitland et al. | |
| 7,890,367 B2 | 2/2011 | Senghore et al. | |
| 7,937,286 B2 * | 5/2011 | Newman et al. | 705/7.31 |
| 8,027,891 B2 * | 9/2011 | Preston et al. | 705/30 |
| 8,195,500 B2 | 6/2012 | Tavares et al. | |
| 8,224,687 B2 | 7/2012 | Tavares et al. | |
| 8,255,268 B2 * | 8/2012 | Rane et al. | 705/7.33 |
| 8,306,846 B2 | 11/2012 | Tavares et al. | |
| 8,328,094 B2 * | 12/2012 | Proud et al. | 235/383 |
| 8,417,561 B2 * | 4/2013 | Ghosh et al. | 705/7.34 |
| 2001/0016819 A1 | 8/2001 | Kolls | |
| 2002/0026348 A1 * | 2/2002 | Fowler et al. | 705/10 |
| 2002/0082920 A1 | 6/2002 | Austin et al. | |
| 2002/0116252 A1 | 8/2002 | Saito et al. | |
| 2003/0018550 A1 * | 1/2003 | Rotman et al. | 705/35 |
| 2003/0216981 A1 * | 11/2003 | Tillman | 705/34 |
| 2004/0088221 A1 | 5/2004 | Katz et al. | |
| 2004/0225556 A1 | 11/2004 | Willen et al. | |
| 2004/0230472 A1 | 11/2004 | Venkat et al. | |
| 2004/0260607 A1 | 12/2004 | Robbins et al. | |
| 2005/0090911 A1 | 4/2005 | Ingargiola et al. | |
| 2006/0143072 A1 | 6/2006 | Herman et al. | |
| 2006/0151598 A1 * | 7/2006 | Chen et al. | 235/380 |
| 2006/0218278 A1 | 9/2006 | Uyama et al. | |
| 2007/0050229 A1 * | 3/2007 | Tatro et al. | 705/9 |
| 2007/0055597 A1 * | 3/2007 | Patel et al. | 705/35 |
| 2007/0083430 A1 | 4/2007 | Summer | |
| 2007/0100728 A1 * | 5/2007 | Rotman et al. | 705/36 R |
| 2007/0179836 A1 | 8/2007 | Juang et al. | |
| 2008/0033587 A1 | 2/2008 | Kurita et al. | |
| 2008/0262900 A1 | 10/2008 | Duffy et al. | |
| 2008/0270363 A1 | 10/2008 | Hunt et al. | |
| 2008/0313017 A1 | 12/2008 | Totten | |
| 2009/0006151 A1 * | 1/2009 | Zarghami et al. | 705/7 |
| 2009/0048884 A1 | 2/2009 | Olives et al. | |
| 2009/0276293 A1 | 11/2009 | Zellner et al. | |
| 2009/0299536 A1 | 12/2009 | Beekhuis | |
| 2009/0319931 A1 | 12/2009 | Hutchings et al. | |
| 2009/0327045 A1 | 12/2009 | Olives et al. | |
| 2010/0070376 A1 * | 3/2010 | Proud et al. | 705/21 |
| 2010/0076813 A1 * | 3/2010 | Ghosh et al. | 705/10 |
| 2010/0287029 A1 | 11/2010 | Dodge et al. | |
| 2011/0035278 A1 | 2/2011 | Fordyce, III et al. | |
| 2011/0035280 A1 | 2/2011 | Fordyce, III et al. | |
| 2011/0087519 A1 | 4/2011 | Fordyce, III et al. | |
| 2011/0087546 A1 | 4/2011 | Fordyce, III et al. | |
| 2011/0087547 A1 | 4/2011 | Amaro et al. | |
| 2011/0087550 A1 | 4/2011 | Fordyce, III et al. | |
| 2011/0093327 A1 | 4/2011 | Fordyce, III et al. | |
| 2011/0093335 A1 | 4/2011 | Fordyce, III et al. | |
| 2011/0184822 A1 | 7/2011 | Matkovic | |
| 2011/0196754 A1 * | 8/2011 | Proud et al. | 705/16 |
| 2011/0251870 A1 | 10/2011 | Tavares et al. | |
| 2011/0251907 A1 | 10/2011 | Tavares et al. | |
| 2012/0084117 A1 | 4/2012 | Tavares et al. | |
| 2012/0089436 A1 | 4/2012 | Tavares et al. | |
| 2012/0089438 A1 | 4/2012 | Tavares et al. | |
| 2012/0191506 A1 | 7/2012 | Tavares et al. | |
| 2012/0233090 A1 | 9/2012 | Tavares et al. | |
| 2013/0151344 A1 | 6/2013 | Tavares et al. | |

OTHER PUBLICATIONS

Wilko Bolt, Nicole Jonker, Corry van Renselaar, Incentives at the counter: An empirical analysis of surcharging card payments and payment behaviour in the Netherlands, Journal of Banking & Finance, vol. 34, Issue 8, Aug. 2010, pp. 1738-1744, ISSN 0378-4266.*

Ching, Andrew T., and Fumiko Hayashi. "Payment card rewards programs and consumer payment choice." Journal of Banking & Finance 34.8 (2010): 1773-1787.*

John Simon, Kylie Smith, Tim West, Price incentives and consumer payment behaviour, Journal of Banking & Finance, vol. 34, Issue 8, Aug. 2010, pp. 1759-1772, ISSN 0378-4266.*

Hong, Ilyoo B. "A new framework for interorganizational systems based on the linkage of participants' roles." Information & management 39.4 (2002): 261-270.*

Markose, Sheri M., and Yiing Jia Loke. "Network Effects on Cash-Card Substitution in Transactions and Low Interest Rate Regimes."*

Klee, Elizabeth. "Families' use of payment instruments during a decade of change in the US payment system." Finance and Economics Discussion Paper2006-01 (2006).*

"SpendTrend—December Transaction Growth Was Healthy: Dec. 2009 Edition". Jan. 11, 2010. First Data Corporation. Dec. 2009 Edition.*

Ahmed, Syed Riaz. "Applications of Data Mining in Retail Business". 2004. Proceedings of the International Conference on Information Technology: Coding and Coputing (ITCC'04).*

Fox, Edward J.; Montgomery, Alan L.; Lodish, Leonard M.; "Consumer Shopping and Spending Across Retail Formats". Jan. 2001.*

Ahmed, "Applications of Data Mining in Retail Business" Proceedings of the International Conference on Information Technology: Coding and Coputing (ITCC'04), Computer Society, 2004, 5 pages.

Author Unknown, "December Transaction Growth Was Healthy," SpendTrend, Edition: Dec. 2009, Jan. 11, 2010, 4 pages, First Data Corporation.

Fox, et al., "Consumer Shopping and Spending Across Retail Formats," Journal of Business, Jan. 2001, 58 pages.

International Search Report and Written Opinion of PCT/US2011/032102 mailed on Oct. 25, 2011, 11 pages.

Mulhern, F. J., "Retail marketing: From distribution to integration," *International Journal of Research in Marketing*, vol. 14, (1997):pp. 103-124.

M2 Presswire, "Research and Markets: UK Retail Finance 2002." Pro Quest. 2003. Retrieved on Apr. 18, 2012 from http://proquest.umi.com/pgdweb?did=293384461&sid=5&Fmt=3&clientId=19649&RQT=30 9&Vname=PQD.

* cited by examiner

SIGNATURE DEBIT TRANSACTION MIX BY NETWORK AND REGION AUGUST 2011

| REGION | MASTERCARD SIGNATURE | VISA SIGNATURE | LARGEST STATE | MASTERCARD SIGNATURE | VISA SIGNATURE |
|---|---|---|---|---|---|
| MIDDLE ATLANTIC | 21.0% | 79.0% | NEW YORK | 27.7% | 72.3% |
| MIDWEST | 25.5% | 74.5% | ILLINOIS | 26.9% | 73.1% |
| NEW ENGLAND | 28.9% | 71.1% | MASSACHUSETTS | 30.2% | 69.8% |
| SOUTH | 22.2% | 77.8% | FLORIDA | 20.1% | 79.9% |
| SOUTHWEST | 20.6% | 79.4% | TEXAS | 25.4% | 74.6% |
| WEST | 15.5% | 84.5% | CALIFORNIA | 15.0% | 85.0% |
| TOTAL | 21.5% | 78.5% | TOTAL | 22.5% | 77.4% |

FIG.24

CREDIT TRANSACTION MIX BY NETWORK AND REGION AUGUST 2011

| REGION | AMEX | DISCOVER | MASTERCARD | VISA | LARGEST STATE | AMEX | DISCOVER | MASTERCARD | VISA |
|---|---|---|---|---|---|---|---|---|---|
| MIDDLE ATLANTIC | 15.2% | 3.5% | 31.0% | 50.3% | NEW YORK | 18.3% | 2.6% | 32.7% | 46.4% |
| MIDWEST | 7.5% | 3.9% | 43.1% | 45.5% | ILLINOIS | 9.0% | 5.5% | 31.4% | 54.0% |
| NEW ENGLAND | 13.3% | 3.2% | 32.4% | 51.1% | MASSACHUSETTS | 14.9% | 3.3% | 32.2% | 49.6% |
| SOUTH | 12.4% | 4.0% | 29.6% | 54.0% | FLORIDA | 14.5% | 3.4% | 29.3% | 52.8% |
| SOUTHWEST | 11.5% | 4.0% | 32.2% | 52.3% | TEXAS | 11.9% | 4.2% | 33.8% | 50.2% |
| WEST | 13.7% | 2.2% | 24.6% | 59.4% | CALIFORNIA | 15.6% | 2.1% | 25.6% | 56.7% |
| TOTAL | 11.7% | 3.5% | 32.0% | 52.9% | TOTAL | 14.3% | 3.3% | 30.2% | 52.2% |

FIG.25

PIN DEBIT TRANSACTION MIX BY NETWORK

| | AUG 10 | SEP | OCT | NOV | DEC | JAN | FEB | MAR | APR | MAY | JUN | JUL | AUG 11 | Q3 10 | Q4 10 | Q1 11 | Q2 11 |
|---|---|---|---|---|---|---|---|---|---|---|---|---|---|---|---|---|---|
| VISA INTERLINK | 48.2% | 47.9% | 46.9% | 46.7% | 46.2% | 46.1% | 45.6% | 45.6% | 45.1% | 45.4% | 45.1% | 45.1% | 45.3% | 47.9% | 46.6% | 45.8% | 45.2% |
| PULSE | 12.0% | 12.0% | 12.4% | 11.9% | 12.2% | 13.2% | 13.5% | 13.8% | 14.0% | 14.0% | 14.3% | 14.5% | 13.9% | 12.0% | 12.2% | 13.5% | 14.1% |
| MASTERCARD MAESTRO | 7.7% | 7.6% | 7.5% | 7.7% | 7.7% | 7.0% | 7.7% | 7.1% | 7.1% | 7.1% | 7.2% | 7.2% | 7.3% | 7.8% | 7.6% | 7.3% | 7.1% |
| NYCE | 6.3% | 6.3% | 6.3% | 6.7% | 7.0% | 6.9% | 6.5% | 6.6% | 6.6% | 6.6% | 6.7% | 6.8% | 6.7% | 6.4% | 6.7% | 6.7% | 6.6% |
| OTHER DEBIT | 25.7% | 26.2% | 26.9% | 27.1% | 26.9% | 26.8% | 26.8% | 26.9% | 27.2% | 26.9% | 26.7% | 26.5% | 26.8% | 26.0% | 27.0% | 26.8% | 26.9% |

FIG. 26

SIGNATURE DEBIT TRANSACTION MIX BY NETWORK

| | AUG 10 | SEP | OCT | NOV | DEC | JAN | FEB | MAR | APR | MAY | JUN | JUL | AUG 11 | Q2 10 | Q3 10 | Q4 10 | Q1 11 |
|---|---|---|---|---|---|---|---|---|---|---|---|---|---|---|---|---|---|
| VISA SIGNATURE | 80.9% | 80.7% | 80.1% | 79.8% | 79.7% | 79.4% | 78.4% | 78.6% | 78.6% | 78.7% | 78.5% | 78.5% | 78.5% | 80.1% | 80.7% | 79.9% | 78.8% |
| MASTERCARD SIGNATURE | 19.1% | 19.3% | 19.9% | 20.2% | 20.3% | 20.6% | 21.6% | 21.4% | 21.4% | 21.3% | 21.5% | 21.5% | 21.5% | 19.9% | 19.3% | 20.1% | 21.2% |

FIG. 27

CREDIT TRANSACTION MIX BY NETWORK

| | AUG 10 | SEP | OCT | NOV | DEC | JAN | FEB | MAR | APR | MAY | JUN | JUL | AUG 11 |
|---|---|---|---|---|---|---|---|---|---|---|---|---|---|
| VISA | 52.5% | 52.2% | 51.2% | 51.4% | 50.9% | 51.0% | 52.3% | 52.4% | 52.4% | 52.6% | 52.6% | 52.6% | 52.9% |
| MASTERCARD | 31.4% | 31.4% | 32.3% | 32.6% | 33.0% | 32.6% | 32.2% | 32.1% | 32.1% | 32.1% | 32.0% | 32.0% | 32.0% |
| AMEX | 12.6% | 12.8% | 12.9% | 12.5% | 12.5% | 12.9% | 12.2% | 12.1% | 12.1% | 11.9% | 11.9% | 11.8% | 11.7% |
| DISCOVER | 3.5% | 3.6% | 3.6% | 3.5% | 3.5% | 3.5% | 3.3% | 3.4% | 3.4% | 3.3% | 3.5% | 3.6% | 3.5% |

| | Q2 10 | Q3 10 | Q4 10 | Q1 11 |
|---|---|---|---|---|
| | 52.2% | 52.4% | 51.2% | 51.9% |
| | 31.6% | 31.4% | 32.7% | 32.3% |
| | 12.8% | 12.7% | 12.6% | 12.4% |
| | 3.4% | 3.6% | 3.5% | 3.4% |

NETWORK ANALYTICS SYSTEMS AND METHODS

CROSS REFERENCES TO RELATED APPLICATIONS

This application is a continuation in part application and claims the benefit of copending U.S. patent application Ser. No. 13/314,988, filed Dec. 8, 2011, which is a continuation-in-part of U.S. patent application Ser. No. 13/032,878, filed Feb. 23, 2011, which is a continuation-in-part of U.S. patent application Ser. No. 12/758,397, filed Apr. 12, 2010, the complete disclosure of which is herein incorporated by reference. This application is also a continuation-in-part of U.S. patent application Ser. No. 13/315,169, filed Dec. 8, 2011 which is a continuation-in-part of U.S. patent application Ser. No. 13/032,878, filed Feb. 23, 2011 which is a continuation-in-part of U.S. patent application Ser. No. 12/758,397, filed Apr. 12, 2012, the complete disclosures of which are herein incorporated by reference.

FIELD

The present invention relates, in general, to market tracking and reporting and, more particularly, to market tracking and reporting using aggregated point-of-sale data.

BACKGROUND

Market trends may result from many types and levels of factors. For example, markets may be affected by various macro- and micro-economic trends, seasonal trends, social trends, corporate trends, etc. Each of these trends may, in turn, be affected by many other types of trends. As such, it may be difficult to develop meaningful data about many markets without supplementing large amounts of diverse types of market data with extensive amounts of data mining, analysis, and assumptions.

Typically, public and private entities may indirectly obtain market data through interviews and/or other techniques. For example, a government employee may contact representative merchant locations to ask about overall performance for a given timeframe (e.g., the past month). Investors may then obtain and analyze this indirect market information in making investment decisions.

These and other techniques, however, may provide limited market information. For example, interviewed merchants or merchant locations may provide inaccurate information, may not actually be representative of the market, etc. Further, delays in obtaining these types of market data may be undesirable for investors and/or other stakeholders.

BRIEF SUMMARY

Among other things, systems and methods are described for tracking and/or reporting market trend data according to point-of-sale (POS) data.

One embodiment of the invention provides a system for market reporting utilizing point-of-sale (POS) data. The system comprises an aggregation subsystem that is communicatively coupled with a POS network comprising a plurality of POS terminals to aggregate POS datasets from the plurality of POS terminals in the POS network. Each POS terminal is disposed at a merchant and is associated with terminal data indicating at least one merchant classifier. Also, each POS terminal is configured to collect transaction data as a function of transactions effectuated via the POS terminal. The transaction data comprises a time of the transaction, an amount of the transaction and an account identifier used to pay for the transaction. Further, each transaction is routed over one of a plurality of payment networks, where each payment network is associated with payment network data. In this way, the POS dataset for each of the POS terminals comprises the terminal data, the payment network data and the transaction data.

A data storage subsystem is communicatively coupled with the aggregation subsystem and is configured to store the aggregated POS data from the plurality of POS terminals in the POS network. A trend processing subsystem is communicatively coupled with the POS data store and is configured to generate a market trend for a designated payment type over a timeframe. This may be done by identifying a payment type dataset from the aggregated POS data, the payment type dataset comprising the POS datasets corresponding to the timeframe and to transactions categorized by payment type. The market trend may be generated as a function of the payment type dataset.

A reporting subsystem is communicatively coupled with the trend processing subsystem and is configured to output graphical report data as a function of the market trend generated by the trend processing system, the graphical report data configured to be displayed on a user device.

A variety of reports may be generated by the reporting subsystem. For example, the report may show the percentage of transactions for each payment type in terms of numbers of transactions. Further, the report may illustrate whether the use of each payment type is increasing or decreasing in terms of numbers of transactions over the timeframe.

As another example, the report may show the percentage of transactions for each payment type in terms of dollar volumes over the timeframe. The report may also show whether each payment type is increasing or decreasing in terms of dollar volumes over the timeframe.

In one particular aspect, the payment type dataset comprises PIN debit transactions, and the report shows the percentage of the number of PIN debit transactions that occurred with each payment network. The report may show the results for a particular time period, such as a given month (as compared to the same month a year previous). The report could also be expanded to show multiple months (each compared to the same month during the previous year) for each type of payment network. Further, similar reports could also be generated for PIN debit transactions in terms of dollar volumes over the timeframes. Still further, similar reports may be generated for signature debit transactions and credit transactions.

For certain card type transactions, such as PIN debit transactions, signature debit transaction and credit transactions, reports may show the transaction growth and dollar volume growth for each payment network over the time frame. This may be done without showing the payment mix (i.e., the transactions broken down according to percentages in the payment networks).

As a further example, for payment type transactions, such as PIN debit transactions, signature debit and credit transactions, the given market may be broken down into one or more geographical regions, and the reports may show the percentage of transactions in different geographical regions where the POS terminals are located. In a similar manner, the given market may comprise one or more industry classifications based on the merchant classifiers, and the reports may display of the percentage of transactions in different industry classifications according to payment network.

In one specific report, the payment type dataset comprises PIN debit transactions, and the report shows the percentage of the dollar volume of PIN debit transactions that occurred with each payment network. The report may also show whether each payment network is increasing or decreasing in dollar volumes of transactions over the timeframe.

In another report, the payment type dataset comprises signature debit transactions, and the reporting subsystem further configures the graphical report data to permit the display of the percentage of the number of signature debit transactions that occurred with each payment network. The report may show whether each payment network is increasing or decreasing in numbers of transactions over the timeframe.

In yet another aspect, the payment type dataset comprises signature debit transactions, and the report shows the transaction growth and dollar volume growth for each payment network over the time frame.

In another aspect, the payment type dataset comprises signature debit transactions, and the report shows the percentage of the dollar volume of signature debit transactions that occurred with each payment network. Further, the report may show whether each payment network is increasing or decreasing in dollar volumes of transactions over the timeframe.

In a further aspect, the payment type dataset comprises credit transactions, and the reporting subsystem further configures the graphical report data to permit the display of the percentage of the number of credit transactions that occurred with each payment network. The report may shows whether each payment network is increasing or decreasing in numbers of transactions over the timeframe.

For credit transactions, the reporting subsystem may further configure the graphical report data to permit the display of transaction growth and dollar volume growth for each payment network over the time frame. Also, for credit transactions, the reporting subsystem may configure the graphical report data to permit the display of the percentage of the dollar volume of credit transactions that occurred with each payment network. The display may show whether each payment network is increasing or decreasing in dollar volumes of transactions over the timeframe.

In a further embodiment, the invention provides an exemplary method for reporting POS data by aggregating POS datasets from a plurality of POS terminals in a POS network. Each POS terminal is disposed at a merchant associated with terminal data indicating at least one merchant identifier and at least one merchant classifier. Each POS terminal is configured to collect transaction data as a function of transactions effectuated via the POS terminal. Further, the transaction data comprises a time of the transaction, an amount of the transaction and an account identifier used to pay for the transaction. Still further, each transaction is routed over one of a plurality of payment networks, where each payment network is associated with payment network data. Conveniently, the POS dataset for each of the POS terminals may be described in terms of the terminal data, the payment network data and the transaction data.

As part of the method, a request is received for a market trend report corresponding to a designated payment type over a designated timeframe. A payment type dataset is identified from the aggregated POS data. The payment type dataset comprises the POS datasets corresponding to the timeframe and to transactions categorized by payment type. Market trend data is generated as a function of the payment type dataset and is output as a report.

The method may produce a variety of reports. For example, the report may display the percentage of transactions for each payment type in terms of numbers of transactions. The report may further show whether each payment type is increasing or decreasing in numbers of transactions over the timeframe.

As another example, the report may show the percentage of transactions for each payment type in terms of dollar volumes over the timeframe. This report may also show whether each payment type is increasing or decreasing in dollar volumes over the timeframe.

In one embodiment, the payment type dataset comprises PIN debit transactions, and the report shows the percentage of the number of PIN debit transactions that occurred with each payment network. This may be shown in terms of whether each payment network is increasing or decreasing in numbers of transactions over the timeframe.

Also for PIN debit transactions, the report may show the transaction growth and dollar volume growth for each payment network over the time frame. In some cases, the given market comprises one or more geographical regions, and the report shows the percentage of transactions in different geographical regions where the POS terminals are located. In other cases, the given market comprises one or more industry classifications based on the merchant classifiers, and the report shows the percentage of transactions in different industry classifications according to payment network. In yet another option, the report shows the percentage of the dollar volume of PIN debit transactions that occurred with each payment network. The report may also show whether each payment network is increasing or decreasing in dollar volumes of transactions over the timeframe.

Although described in connection with PIN debit transactions, similar reports may be produced for other transaction types, such as signature debit and credit transactions. For instance, the reports may show the percentage of the number of card type transactions that occurred with each payment network, and whether each payment network is increasing or decreasing in numbers of transactions over the timeframe. Reports may also show transaction growth and dollar volume growth for each payment network over the time frame, or the percentage of the dollar volume of signature debit transactions that occurred with each payment network.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 24 illustrates a report showing signature debit transactions according to payment network and geographic region.

FIG. 25 illustrates a report showing credit transactions according to payment network and geographical region.

FIG. 26 illustrates a report showing PIN debit transactions according to payment network for a twelve month period.

FIG. 27 illustrates a report showing signature debit transactions according to payment network for a twelve month period.

FIG. 28 illustrates a report showing credit transactions according to payment network for a twelve month period.

DETAILED DESCRIPTION OF THE INVENTION

Figure 1:
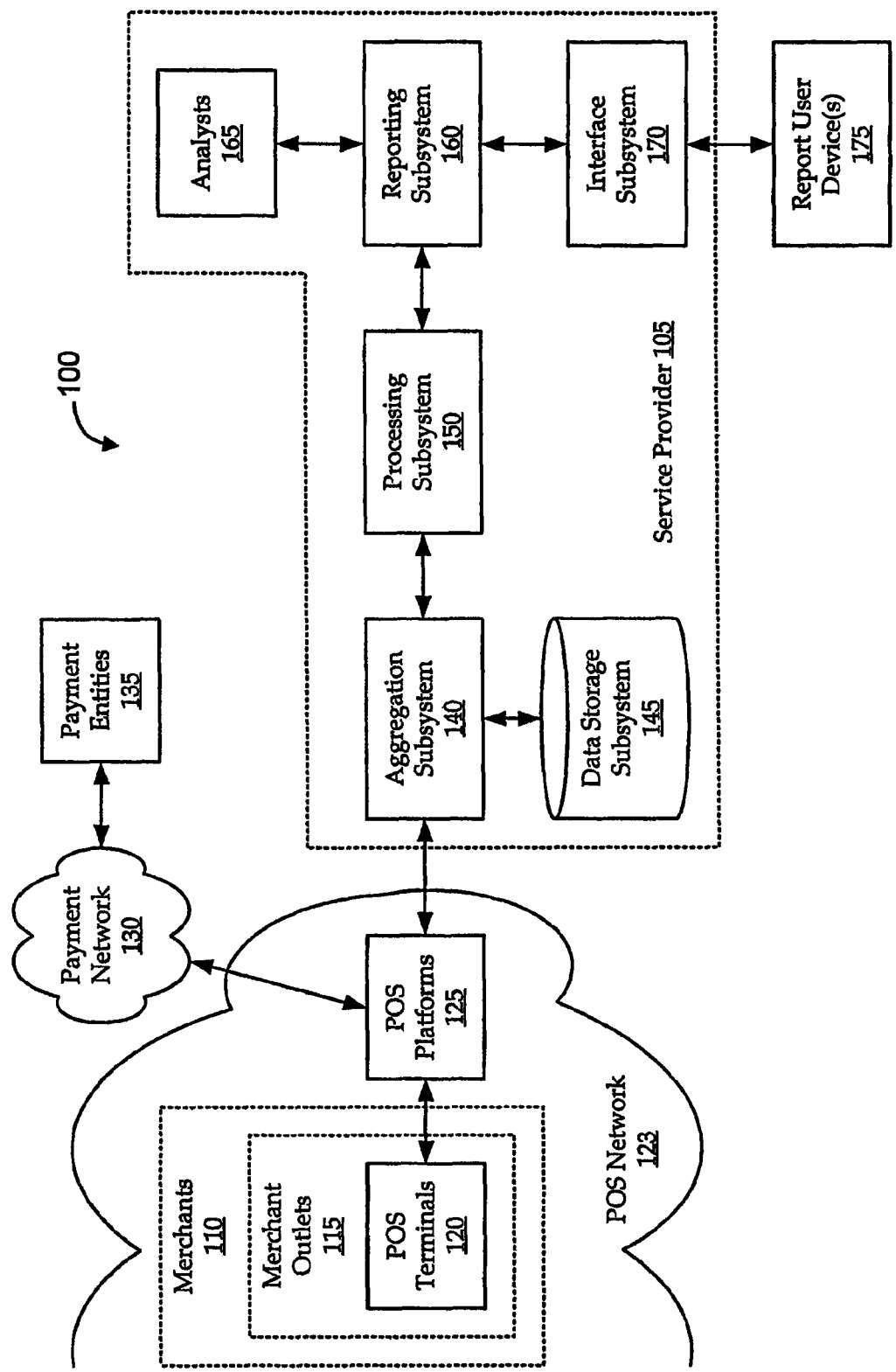
FIG. 1 shows a block diagram of an illustrative market network, according to various embodiments.

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

It is well appreciated by investors, consumers, corporate officers, and other market participants that understanding various states and trends of markets can prove extremely valuable. It is also well appreciated by market participants that it may be difficult, or even impossible, to get a complete and accurate picture of many markets. For example, many market trends typically result from a large number of factors having varying types and magnitudes of effects on the market at issue. Further, many of these factors depend on data that may be difficult or impossible to obtain, including, for example, certain types of proprietary data, data from diverse and often-unreliable sources, etc.

In one typical example, market trends are generated by collecting data from a number of indirect sources. Public and private agencies may contact representative merchant locations to ask about overall performance for a given timeframe (e.g., the past month), various market reporters may gather rumors, speculation, and snippets of data from multiple sources, etc. Investors and analysts may then cull this indirect market information to make educated guesses about current and future market positions.

Notably, many typical techniques for gathering market data may provide limited and/or undesirable results. For example, interviews, rumors, and speculation all have a potential of generating inaccurate information, information that is not representative of the market (e.g., information restricted to a subset of market participants, to a particular geographic region, etc.), etc. Additionally, much of these types of information can only be gathered retrospectively (e.g., a merchant location may only be able to accurately answer questions about its performance for a month after the books have been closed for the month). As such, there may be delays in obtaining these data, which may be undesirable for investors and/or other stakeholders.

Among other things, embodiments described herein exploit actual transaction data aggregated from point-of-sale (POS) terminals to generate and report market trend data. In some embodiments, data from very large numbers of POS terminals are used to generate complete and accurate market trend data in a substantially timely fashion, for example in comparison to using interviews and/or other indirect techniques.

The market trend data may be used to produce a wide variety of reports, such as to show whether sales are increasing or decreasing over time. One particular set of reports is to determine the types of payment instruments or payment accounts that are used when making transactions and whether these are increasing or decreasing relative to a reference time period. Merely by way of example, types of payment instruments or payment types that may be reported include credit card transactions, signature debit card transactions, PIN debit transactions, EBT transactions, stored value transactions, traditional paper check transactions, ACH transactions, and the like. Reports may also be produced showing the types of card associations or payment processors used to process the transactions, and whether the transactions for each of these types increases or decreases relative to a reference time frame. Examples of payment networks include networks such as VISA Interlink, debit networks, PULSE, MasterCard, NYCE, and the like. These reports may be further categorized using other categories, such as by region, by industry type, and the like.

Turning first to FIG. 1, a block diagram of an illustrative market network 100 is shown, according to various embodiments. As illustrated, a service provider 105 is in communication with a number of POS terminals 120 that are in further communication with a payment network 130. Transactions are effectuated via the POS terminals 120 (e.g., using payment cards and/or other known forms of payment). In some embodiments, payment entities 135 interact with the payment network 130, for example, to perform various authorization and/or other functions relating to the transactions. Data from the transactions may be aggregated by the service provider 105 for use in generating market report data. In some embodiments, one or more report user devices 175 are in communication with the service provider 105, for example, to exploit the generated market report data.

Use of POS terminals 120 in effectuating transactions is well known in the art. As such, and for the sake of clarity, specific operations of POS terminals 120, POS networks 123, payment networks 130, payment entities 135, etc. will not be fully described herein. Rather, these and related terms and phrases should be broadly construed to include any transaction facilitating devices, systems, and techniques that are useable in the context of the various embodiments described herein.

For example, as used herein, POS terminals 120 may include cash registers, and any other alternative and/or peripheral devices or systems, including hardware and/or software, for effectuating transactions between a merchant and a consumer. POS platforms 125, as used herein, include any hardware and/or software for facilitating communications between one or more POS terminals 120 and the payment network 130 and/or service provider 105. In one embodiment, the POS platforms 125 include proprietary platforms, such as merchant platforms offered by First Data Corporation. In some embodiments, one or more interfaces are included with the POS terminals 120 and/or the POS platforms 125 to facilitate use by end consumers (e.g., cardholders, payors, etc.), salespersons, etc. The POS network 123, as used herein, is intended to broadly include any type of physical or virtual network, including one or more communications networks, corporate networks, etc. For example, a large number of globally distributed POS terminals 120 may, in some embodiments, be considered as part of a global POS network 123, even where some or all of the POS terminals 120 in the POS network 123 may not be in communication with one another.

As used herein, "POS terminals" are intended to include both physical terminals located at brick and mortar locations as well as virtual terminals (some type of computer system) capable of receiving and processing transaction requests. For example, financial transactions occurring other than at brick and mortar locations can include Internet transactions (typically involving a merchant web site or other payment portal, such as PayPal), mobile transactions made using a mobile device or phone, and the like. For these transactions, payment information is transmitted over some type of network to a computer system that is capable of receiving such transactions and then processing them to complete the financial transaction. It will be appreciated, however, that some transactions using mobile devices (such as mobile phones, iPads, and the like) can be made by directly or indirectly interfacing with POS terminals located in brick and mortar locations as well.

The POS terminals located at brick and mortar locations can capture transaction data in a number of ways, including by the use of payment cards with magnetic stripes, smart chips, RF transponders (RFID chips) or the like. The POS terminals can also read transaction information from non-traditional "cards", such as when reading information from checks or other negotiable instruments, such as by reading MICR lines, by the use of OCR scanners, by manually keying in data, or the like. Further, various communication channels can be used to transmit data from the payment vehicle to the POS terminal, such as by Bluetooth, cellular, RF, and the like. These configurations permit payments to be made using a variety of payment vehicles, including by credit cards, debit cards, checks or other negotiable instruments, ACH transaction, prepaid cards or accounts, stored value cards or accounts, and the like. In each of these, the appropriate information will be captured from the transaction at the POS terminal so that reports may be produced as described herein.

Hence, when receiving the transaction data, the POS terminals capture data pertinent to conducting a transaction, such as the amount of the transaction, the payment instrument or vehicle, the time of the transaction, and the like. The POS terminals also provide information on the location of the POS device (or location of the merchant—by physical address, web site or the like) as described hereinafter.

As illustrated, some or all of the POS terminals 120 may be located at (e.g., inside, on the property of, in close proximity to, etc.) a merchant outlet 115. The merchant outlet 115 may be the only one, or one of many, locations of a particular merchant 110. For example, each merchant outlet 115 may be a physical store location, a franchise location, a branch office, virtual presence, etc. of a merchant 110. Of course, where the merchant 110 has only a single presence, the merchant outlet 115 and the respective merchant 110 may be one and the same.

Embodiments of the POS terminals 120 are configured to be associated with certain types of information and to collect certain types of information. For example, each POS terminal 120 may collect and/or be associated with terminal information and transaction information, as described more fully below. The transaction and terminal information may be sent to the POS platforms 125 for various types of processing. For example, some or all of the information may be sent to the payment network 130 for authorization by one or more payment entities 135 (e.g., issuing banks, payment card companies, etc.), and/or the information may be sent to the service provider 105.

Functions of the service provider 105 may be carried out by one or more subsystems. In various embodiments, components of the subsystems are implemented, in whole or in part, in hardware. Thus, they may include one or more Application Specific Integrated Circuits (ASICs) adapted to perform a subset of the applicable functions in hardware. Alternatively, the functions may be performed by one or more other processing units (or cores), on one or more integrated circuits (ICs). In other embodiments, other types of integrated circuits may be used (e.g., Structured/Platform ASICs, Field Programmable Gate Arrays (FPGAs), and other Semi-Custom ICs), which may be programmed. Each may also be implemented, in whole or in part, with instructions embodied in a computer-readable medium, formatted to be executed by one or more general or application specific controllers.

In some embodiments, data from all the POS terminals 120 is received and aggregated by an aggregation subsystem 140.

The aggregation subsystem 140 generates and stores aggregated POS datasets in a data storage subsystem 145. Embodiments of the data storage subsystem 145 may include any useful type of data storage. For example, the data storage subsystem 145 may include servers, hard disks, etc. Further, the aggregated data may be stored using any useful types of security, data structure, etc. In one embodiment, the aggregated data is stored as an associative database to facilitate various types of data processing functions (e.g., mining, filtering, sorting, etc.).

In some embodiments, as described more fully below, the aggregated data may be processed by a processing subsystem 150. Embodiments of the processing subsystem 150 are configured to generate various types of market trend and/or other data for use by a reporting subsystem 160. Embodiments of the reporting system 160 use the data generated by the processing subsystem 150 to generate one or more types of market reports. In some embodiments, additional information is used to generate reports, including data received from one or more analysts 165 and/or other data sources.

The service provider 105 may further include an interface subsystem 170 to facilitate interaction with and/or delivery of reporting data generated by the reporting system. In some embodiments, one or more report user devices 175 interface with the service provider via the interface subsystem 170. For example, the report user devices 175 may request certain reports, receive report data for viewing, etc.

Figure 2:
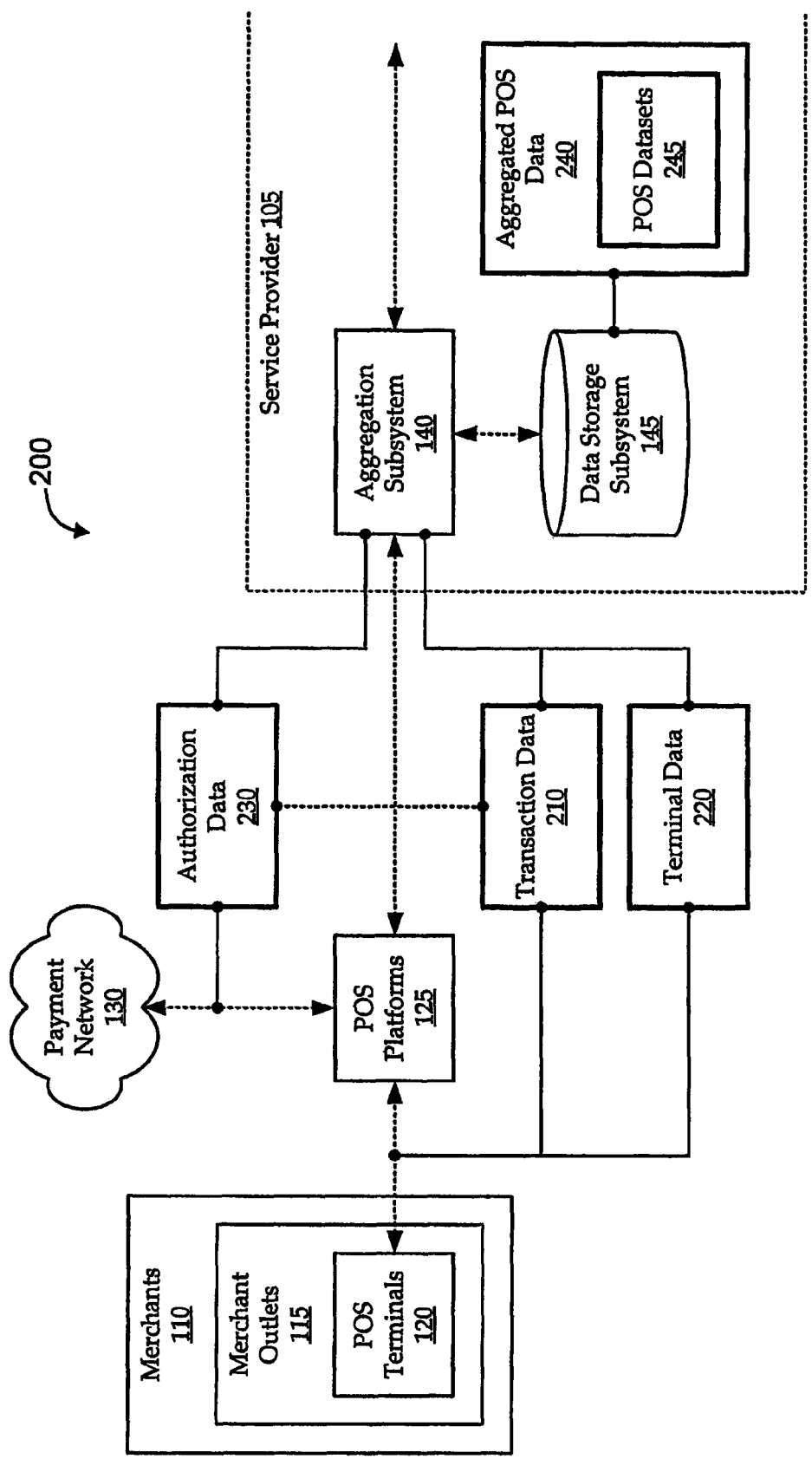
FIG. 2 shows a data flow diagram in the context of a first portion of a market network, according to various embodiments.
Figure 3:
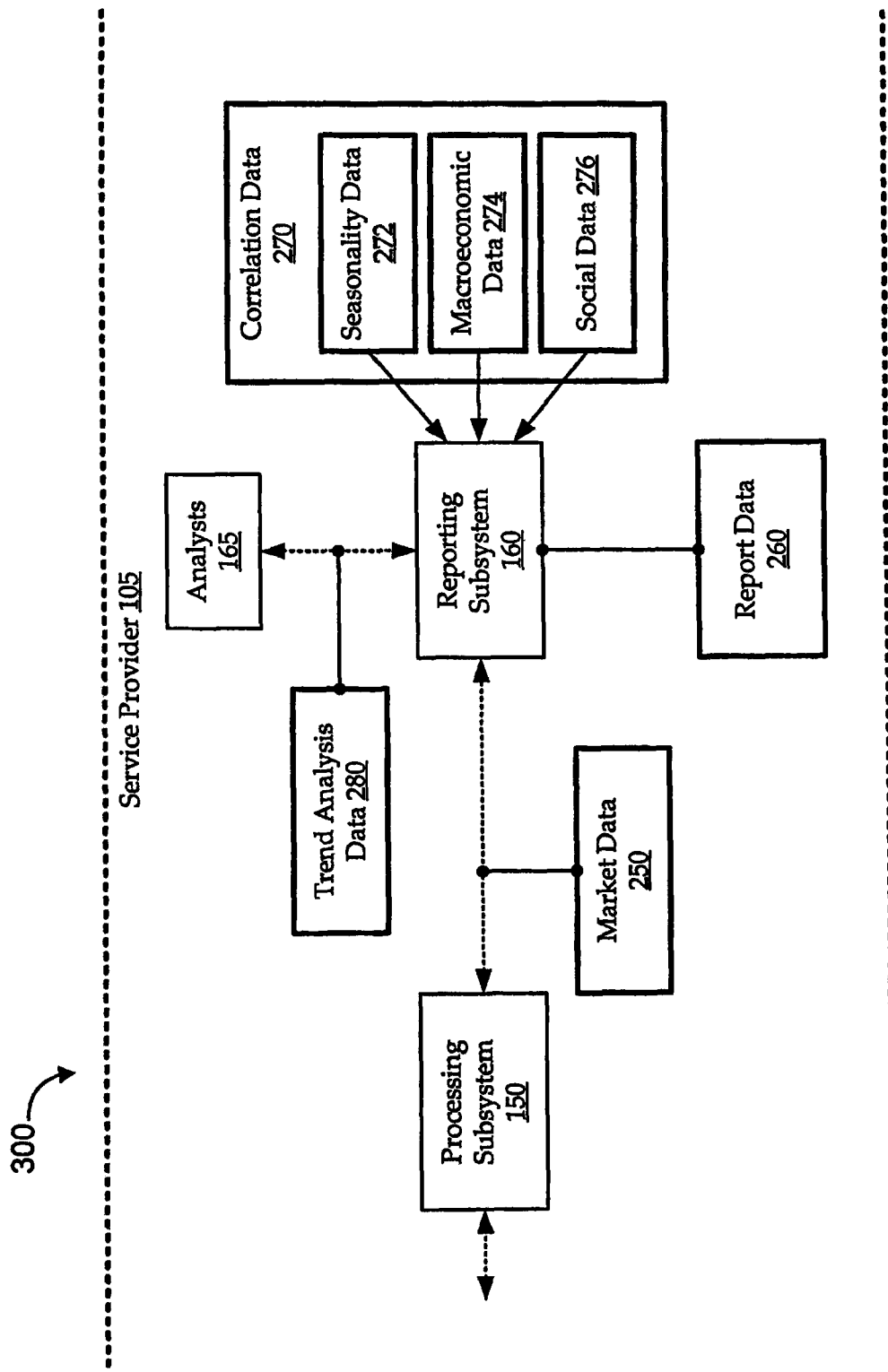
FIG. 3 shows a data flow diagram in the context of a second portion of a market network, according to various embodiments.
Figure 4:
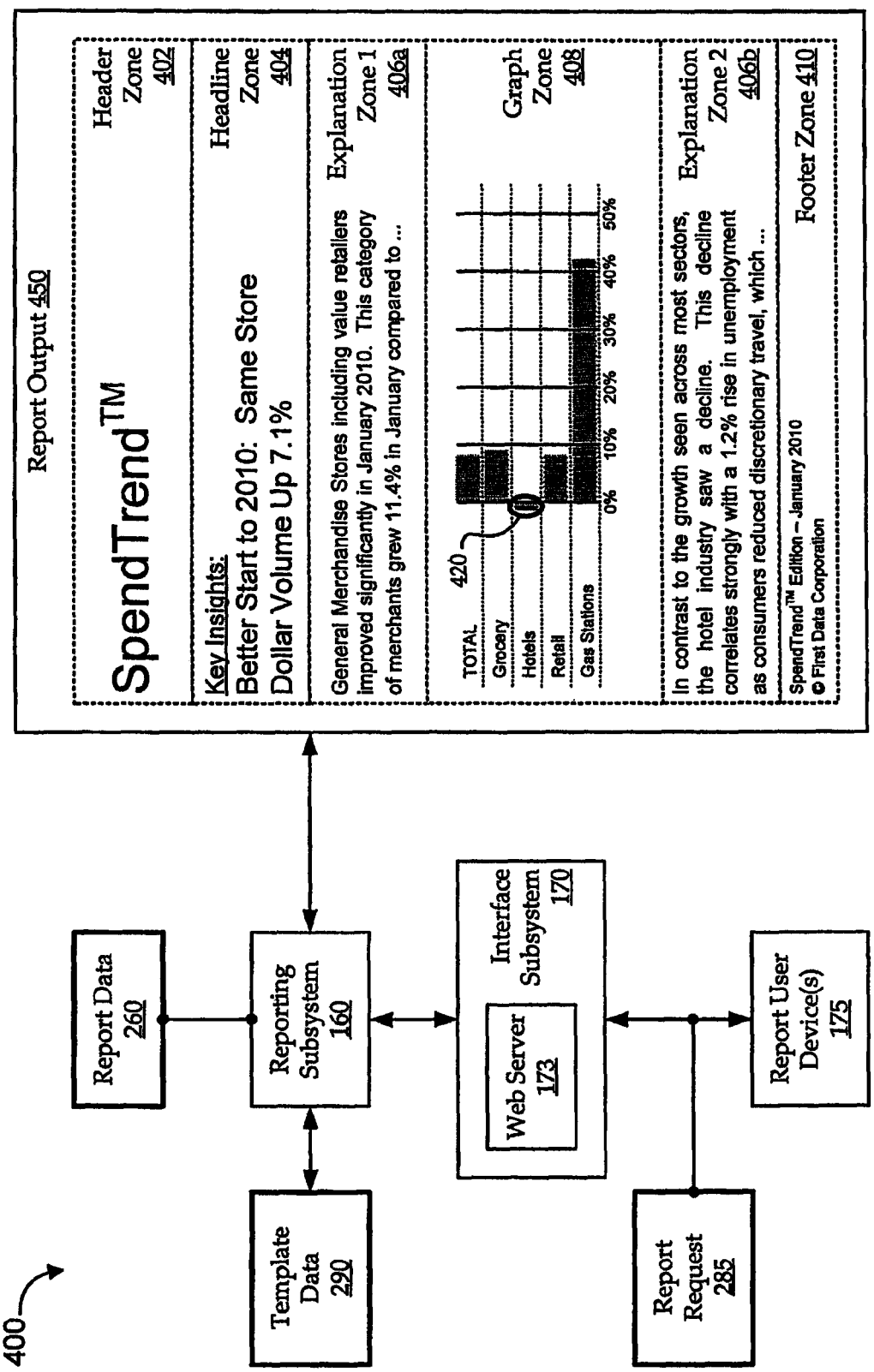
FIG. 4 shows a data flow diagram in the context of a third portion of a market network, according to various embodiments.

The functionality of various components of the market network 100, including the various subsystems of the service provider 105, will be described more fully below. For example, FIGS. 2-4 illustrate some embodiments of data flow through market networks, like the market network 100 of FIG. 1, each focusing on a portion of the data flow for the sake of clarity. Turning first to FIG. 2, a data flow diagram 200 is shown in the context of a first portion of a market network, according to various embodiments.

Embodiments of the data flow diagram 200 focus on generation and aggregation of POS data. As in a portion of the market network 100 of FIG. 1, a service provider 105 is in communication with a number of POS terminals 120 that are in further communication with a payment network 130. Embodiments of the POS terminals 120 are disposed at (e.g., located in or near) merchants 110 or merchant outlets 115. Transactions are effectuated via the POS terminals 120. Data from the transactions may be aggregated by an aggregation subsystem 140 of the service provider 105, which may be stored in a data storage subsystem 145.

Embodiments of the POS terminals 120 are configured to be associated with certain types of information and to collect certain types of information. While each POS terminal 120 may collect and/or be associated with many different types of information, some typical types of information can be classified into two general categories: transaction data 210 and terminal data 220. The terminal data 220 may include information relating to (e.g., identifiers corresponding to) the merchant 110 and/or particular merchant outlet 115 where the POS terminal 120 is located, network information (e.g., Internet protocol (IP) address, security protocols, etc.), configuration information (e.g., types of payment instruments accepted, software version, etc.), and/or any other information relating to the POS terminal 120 and not specifically to any transaction effectuated via the POS terminal 120.

It is worth noting that the terminal data 220 may indicate various characteristics of the POS terminals 120 in various ways. For example, various types of merchant classifiers may be used. In one embodiment, a merchant classifier code (MCC) defined by a government standard is used to identify each merchant. In other embodiments, a proprietary code may be used. Further, in some embodiments, each merchant is identified by a single classifier, even where the merchant operates in multiple markets. For example, a megastore may sell groceries, general merchandise, gasoline, insurance services, etc., but the merchant may be classified only using a "grocery" classification. In an alternate embodiment, the megastore may be classified using multiple classifiers. In still another embodiment, the megastore may be classified by both a single classifier (e.g., a default classifier, or a classifier chosen to comply with a particular standard) and by one or more other classifiers (e.g., according to proprietary classification systems).

The transaction data 210, on the contrary, may include any type of information relating to one or more transactions effectuated via the POS terminal 120. For example, the transaction data 210 may include timestamp information (e.g., a date and time, or time range, of one or more transactions), transaction value, fee and/or discount information, product category and/or description information, demographic information (e.g., relating to the payor), etc.

The transaction data 210 that is collected by POS terminal 120 may depend on the particular payment instrument used to effectuate a payment. For example, when paying by credit or debit card, the track two data is typically read using a magnetic stripe reader. Also, the amount of the purchase is entered, typically electronically from a cash register. For Internet transactions, the amount may be generated from the merchant's web site or a payment processing company. For negotiable instruments, the MICR line is typically read using the POS terminal 120. Other information, such as the amount of the check, may also be entered, either by manually keying in the information, electronically by the cash register, from a web site or the like. For closed-loop prepared cards, such as traditional magnetic strip gift cards, the account number is typically read from the magnetic stripe and the amount of the transaction is received by manual key in, from a cash register, from a web site or the like. Transactions from mobile devices or from the Internet typically include data similar to traditional payment forms, as such transactions usually stem from electronic wallets that typically include information similar to their physical counterparts. However, these transactions also include data indicating that the transaction originated from a mobile device or the interne and can be used in generating market reports.

Not all the transaction data received at the POS terminal 120 may be needed in order to generate the market reports. As such, a parsing processes may be used to extract only the relevant data needed to produce the reports. This parsing can occur at various locations, including but not limited to the POS platforms 125, the service provider 105, aggregation subsystems, or the like.

The transaction data 210 and terminal data 220 may be sent to the POS platforms 125 for various types of processing. In certain embodiments, some or all of the transaction data 210 may be sent from the POS platforms 125 to the payment network 130 for authorization. For example, transactions may be authorized, denied, canceled, etc. In some embodiments, the authorization process generates authorization data 230 that may or may not be included in the transaction data 210. In some embodiments, the transaction data 210, terminal data 220, and/or authorization data 230 are sent from the POS platforms 125 to the service provider 105. In various embodiments, information may be communicated to the service provider 105 periodically (e.g., every night), as a result of a trigger event (e.g., after a particular magnitude change in an economic indicator or social event), on demand (e.g., on request by the service provider 105), etc.

In some embodiments, the various types of data are sent to the aggregation subsystem 140 using standard formats and/or protocols. In other embodiments, the aggregation subsystem 140 is configured to process (e.g., parse) the data into a usable and/or desired format. The data may then be stored in the data storage subsystem 145 as aggregated POS data 240. In some embodiments, the aggregated POS data 240 is a collection of POS datasets 245. It is worth noting that the aggregated POS data 240 may be arranged in any useful way, for example, as an associative database, as a flat file, as sets of POS datasets 245, in encrypted or unencrypted form, in compressed or uncompressed form, etc.

Embodiments may then use the aggregated POS data 240 to generate market data. FIG. 3 shows a data flow diagram 300 in the context of a second portion of a market network, according to various embodiments. In some embodiments, the context of FIG. 3 includes various subsystems of the service provider 105. For example, as illustrated in the data flow diagram 200 of FIG. 2, aggregated POS data 240 may be generated by the aggregation subsystem 140 and stored in the data storage subsystem 145. This aggregated POS data 240 may then be used by other subsystems of the service provider 105 for further processing.

In some embodiments, the processing subsystem 150 uses the aggregated POS data 240 (e.g., either directly from the data storage subsystem 145 or via the aggregation subsystem 140) to generate market data 250. For example, the aggregated POS data 240 may include merchant type flags, merchant identifiers, merchant outlet identifiers, transaction amounts, numbers of transactions, payment types used, transaction types (e.g., sale, cash advance, return, etc.), transaction authorizations (e.g., authorize, decline, etc.), timestamps, etc. As used herein, the market data 250 may include any types of data useful in generating market analyses and/or reports that can be extracted and/or derived from the aggregated POS data 240.

In some cases, a type of mapping may be used in order to be useful for a given market, such as trends by industry, geography, card type and the like. For instance, data from the POS terminal may reveal the identity of a given merchant. This merchant may then be classified into a specific industry, such as fast food, so that a trend report may be produced by industry. A similar approach can be used when determining trends by geography, such as by knowing the zip code of the merchant or other geographic identifier originally gleaned from the POS terminal. For card types, the transaction data can be evaluate to determine what payment instrument was used in the transaction. As described above, not all data collected at the POS terminals need be used to generate the reports. This may be done for both POS terminals located in physical stores as well as virtual POS terminals used with e-commerce and mobile transactions.

Given these and/or other types of aggregated POS data 240, the market data 250 may include extracted or classified data, such as data extracted for a particular time period, data extracted for all records having the same store identifier, data classified by merchant type, data classified by location (e.g., merchant region, geographic region, etc.), data classified by dollar volume, data classified by average ticket price, etc. The market data 250 may additionally or alternately include trend data, such as data trends over a particular time period or compared to a baseline. The trends may look at time periods, payment types, merchants, merchant categories, geography, transaction volumes, ticket values, or any other useful (e.g., and derivable) characteristics of the aggregated POS data 240.

In some embodiments, the market data 250 is used by a reporting subsystem 160 of the service provider 105. Embodiments of the reporting subsystem 160 use the market data 250 to generate report data 260. The report data 260 may typically include data desired for generation of a market report, which may, for example, include data to support graphical representations of trends (e.g., for generation of bar graphs, pie charts, line graphs, spreadsheets, etc.), indications of events (e.g., for highlighting data, circling data, flagging data, etc.), etc.

While certain embodiments of the reporting subsystem 160 generate reporting data 260 only according to market data 250, other embodiments may use additional data. In some embodiments, the reporting subsystem 160 is configured to interface with one or more analysts 165 (e.g., human or machine). The analysts 165 may generate trend analysis data 280. For example, the trend analysis data 280 may include explanations, headlines, annotations, etc., for example, for adding value to an end user of the report data 260.

In some embodiments, the reporting subsystem 160 is in communication with one or more sources of correlation data 270. The correlation data 270 may include any type of data that could be useful in identifying correlations with and/or explanations of the market data 250. For example, embodiments of the correlation data 270 include seasonality data 272, macroeconomic data 274, and/or social data 276.

Embodiments of the seasonality data 272 may include information relating to time of year, number of workdays, number of weekends in a month, season, holidays, etc. For example, January revenue may correlate at least in part to the number of weekends in January each year. Embodiments of macroeconomic data 274 may include information relating to gross domestic product, personal bankruptcy, unemployment, total consumer debt, etc. For example, an increase in unemployment in a geographic region may correlate to an increase in fast food sales for that region. It is worth noting that the term "macroeconomic" is used herein only to distinguish from economic transaction data for a particular POS terminal 120. It will be appreciated that certain data, which may technically be classified as "microeconomic" in nature may be included in the macroeconomic data 274, such as economic trends relating to a particular subset of consumers, to particular externalities or market failures, to a particular merchant outlet or branch office, etc. Embodiments of social data 276 may include information relating to particular social trends, fads, military incursions, regulatory issues, political issues, etc. For example, a beef scare relating to a grocery store in a particular week may correlate to a drop in revenue for that grocery merchant for that week.

It will be appreciated that many other types of correlation data 270 are possible and may be received and/or derived from many types of sources. The correlation data 270 may also be collected periodically, based on historical data that was gathered or generated previously, etc. It will be further appreciated that the correlation data may be used by the analysts 165 in generating trend analysis data 280. For example, an analyst 165 may identify a correlation between the market data 250 and certain correlation data 270. The analyst 165 may then write up an explanation of the correlation, identify the correlation, do more research, etc. Other types and uses of correlation data 270, trend analysis data 280, and/or other data is described more fully below.

The report data 260 generated by the reporting subsystem 160 may be used in a number of different ways. Some of these ways are described with reference to FIG. 4. FIG. 4 shows a data flow diagram 400 in the context of a third portion of a market network, according to various embodiments. In some embodiments, the reporting subsystem 160 generates the report data 260 according to embodiments described with reference to FIG. 3. The report data 260 may then be used to generate one or more types of reports.

In some embodiments, the reporting subsystem 160 is in communication with an interface subsystem 170. Embodiments of the interface subsystem 170 are configured to provide an interface between the reporting subsystem 160 (and/or other subsystems of the service provider 105) and one or more consumers of the report data 260. For example, one or more end consumers may interact with the interface subsystem 170 via one or more report user devices 175. In various embodiments, the report user devices 175 may include any type of device capable of providing the desired report data 260 to the end consumer. For example, the report user devices 175 may include desktop and laptop computers, smart phones, personal digital assistants, e-readers, etc.

In some embodiments, the report user devices 175 interact with the interface subsystem 170 over a network (e.g., the Internet). These interactions may be facilitated in certain embodiments by a web server 173 in the interface subsystem 170. Some embodiments of the interface subsystem 170 may further include interface elements for various functions, such as authorization (e.g., login elements, encryption elements, etc.), graphical user interface handling, query handling, etc.

Embodiments of the interface subsystem 170 are used to facilitate provision of a report output 450 (e.g., a graphical report product) to one or more report user devices 175. In certain embodiments, the report user devices 175 can provide report requests 285 to the reporting subsystem 160 via the interface subsystem 170. For example, the report requests 285 may include one or more queries and/or other information for generating a report from the report data 260. Alternately, the report requests 285 may be issued after a report output 450 has already been generated, for example, to filter, refine, update, reformat, or otherwise affect the report output 450. In certain embodiments, report outputs 400 are generated without allowing for any report requests 285 before or after the report generation. Further, in some embodiments, report outputs 400 are generated according to automatically generated report requests 285. For example, a subscriber of a reporting service may have certain preferences (e.g., selected preferences, preferences based on the subscriber's portfolio, etc.), which may be used to decide what information is presented in a report output 450 and/or in what form.

In some embodiments, the report output 450 is also affected by template data 290. Depending on the type of output, the template data 290 may include any useful formatting or presentation information. For example, the template data 290 may include a style sheet, font information, margin information, graphics, etc. In certain embodiments, the template data 290 defines certain zones on all or part of the report output 450. Each zone may be dependent on other zones or independent, it may be automatically filled with report data or left open for manual input, or used in any other useful way.

In the illustrated embodiment of FIG. 4, the report output 450 includes 6 zones: a header zone 402, a headline zone 404, a first explanation zone 406a, a graph zone 408, a second explanation zone 406b, and a footer zone 410. These zones are intended only for illustration and should not be construed as limiting in any way. The header zone 402 and the footer zone 410 may include header and footer information, respectively. For example, the report output 450 may include a page header with logos, etc., copyright notices, edition information, etc. The headline zone 404 is illustrated to include a headline for the page. For example, the headline may point out a key insight illustrated by the other report data 260 shown on the page. The first explanation zone 406a is illustrated to include a general explanation to support the headline shown in the headline zone 404. For example, the first explanation zone 406a may include additional data and details relating to the key insight, trends, etc., and may provide an introduction to other information on the page. The graph zone 408 may include a graphical representation of a certain portion of the market data 250 (e.g., data relating to the key insight). The second explanation zone 406b is illustrated to explain and further support data from the graph zone 408, the first explanation zone 406a, etc.

In the example illustrated, market data 250 from January 2010 illustrates that same store dollar volumes are up 7.1-percent, as noted in the headline zone 404. The first explanation zone 406a, second explanation zone 406b, and graph zone 408 support this headline. For example, the bar graph in the graph zone 408 shows dollar volume growth for January 2010. As shown, grocery and retail are up around ten-percent, hotels are down around two-percent, and gas stations are up over forty-percent.

It is worth noting that the data in various embodiments may be focused on same store performance. As used herein, "same store" data generally refers to data aggregated from either an identical set of POS terminals 120 or from a statistically insignificant change in a sample set. For example, as discussed above, the market data 250 is derived using actual data from actual transactions effectuated via actual POS terminals 120. As such, real-world changes in the number of POS terminals 120 may have a noticeable effect on generated data if not properly accounted for.

Suppose, for example, that thirty new merchant outlets 115 open for a particular merchant 110 over a single year, and each merchant outlet 115 has an average of four POS terminals 120. The aggregated POS data 240 may show a large increase in dollar volume over that time period. For certain market reports, that information may be useful. For example, certain investors may be interested in the overall growth of that particular merchant's 110 dollar volume over the timeframe. For other market reports, however, it may be desirable to have an "apples-to-apples" comparison from one timeframe to another. For example, the overall growth may provide little or no information about representative growth of particular stores, of particular markets, etc.

As such, it may be desirable to generate reports based on a "same store" analysis. For example, it may be desirable to generate market data for substantially the same store sample set over two different timeframes. Notably, this and/or other functionality may include removal of irrelevant and/or unreliable data (e.g., or identification of relevant and/or reliable data. As such, certain embodiments generate a reliable portion of the market data 250 for use in generating the report data 260.

In one embodiment, when the aggregated POS data 240 shows insufficient data over the timeframe of interest (e.g., a particular POS terminal 120 has only been collecting transaction data 210 for a portion of the timeframe), the data may be removed from the analytical dataset. In another embodiment, statistical analyses may be performed to determine whether to use certain data. For example, market data 250 may be generated with and without certain data, and the differences may be analyzed to determine whether they are significant. Where the differences are significant, the data may be discarded and/or further analysis may be performed to determine why the difference is significant (e.g., and whether that significant difference would be worth reporting as part of the report data 260).

Notably, the report output 450 may further include various types of indications. In one embodiment, when data is discarded, it may still be included in the report data 260 and indicated as such. For example, a line of a spreadsheet may be struck through, or an asterisk may be included, to indicate that insufficient data was available. In other embodiments, indications are used to highlight or otherwise indicate trend events.

As used herein, trend events generally include any data point, data range, trend result, etc. that is identified as being potentially of interest. For example, as discussed above, various types of trend analysis data 280 and/or correlation data 270 may be used to identify correlations and other trend events. Trend events may be indicated in any useful way. For example, as illustrated in FIG. 4, a trend event indicator 420 is shown on the graph in the graph zone 408. The trend event indicator 420 is illustrated as a circle around the portion of the graph showing negative growth for the hotel industry. Of course, any type of indicator may be used, for example, including a color, shading, typeface, font, flags, highlighting, text, icons, etc.

While not indicated, other reporting and display techniques may be used to enhance the look, feel, usefulness, etc. of the report output 450. In one embodiment, the report output 450 is configured to be displayed through a web browser or similar interface using a report user device 175. A user may interact with the report output 450 using menus, buttons, links, and/or other navigation elements. The navigation may allow the user, for example, to jump between sections of the report output 450, to show or hide elements (e.g., the second explanation zone 406b), to dynamically process (e.g., filter, sort, etc.) charted data, to reformat the page layout, etc.

Figure 5:
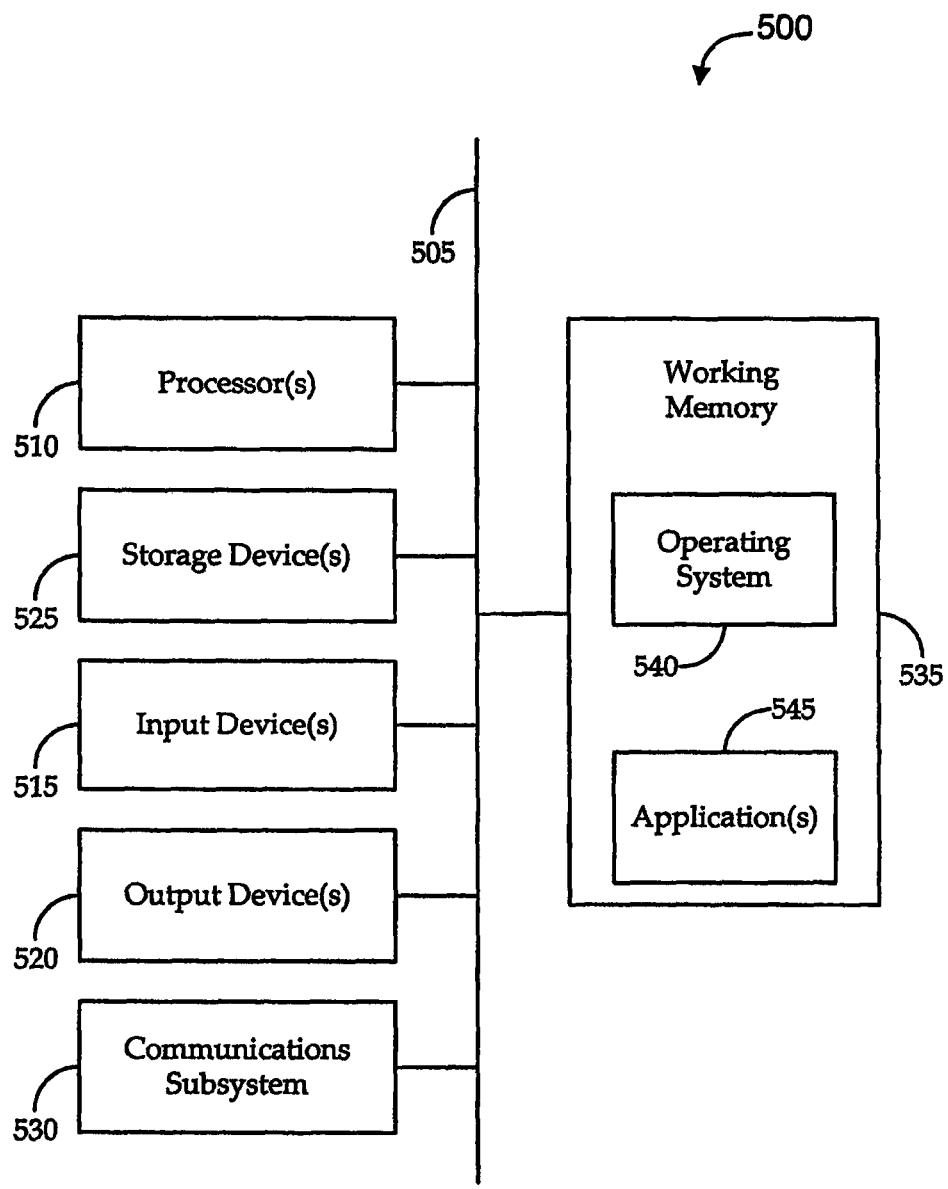
FIG. 5 shows an illustrative computational system for performing functionality to facilitate implementation of embodiments described herein.

As discussed above, the various subsystems of the service provider 105 may be implemented in hardware and/or software. In some embodiments, one or more computational systems are used, having instructions stored in memory that can be executed to cause processors and/or other components to perform certain methods (e.g., by implementing functionality of one or more of the subsystems). FIG. 5 shows an illustrative computational system 500 for performing functionality to facilitate implementation of embodiments described herein. For example, components of the computational system 500 may be used to implement functionality of one or more subsystems of the service provider 105. It should be noted that FIG. 4 is meant only to provide a generalized illustration of various components, any or all of which may be utilized as appropriate. FIG. 5, therefore, broadly illustrates how individual system elements may be implemented in a relatively separated or relatively more integrated manner.

The computational system 500 is shown to include hardware elements that can be electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include without limitation a mouse, a keyboard and/or the like; and one or more output devices 520, which can include without limitation a display device, a printer and/or the like.

The computational system 500 may further include (and/or be in communication with) one or more storage devices 525, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 500 might also include a communications subsystem 530, which can include without limitation a modem, a network card (wireless or wired), an infrared communication device, a wireless communication device and/or chipset (such as a Bluetooth device, an 802.11 device, a WiFi device, a WiMax device, cellular communication facilities, etc.), and/or the like. The communications subsystem 530 may permit data to be exchanged with a network (such as the network described below, to name one example), and/or any other devices described herein. In many embodiments, the computational system 500 will further include a working memory 535, which can include a RAM or ROM device, as described above.

The computational system 500 also can include software elements, shown as being currently located within the working memory 535, including an operating system 540 and/or other code, such as one or more application programs 545, which may include computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 525 described above.

In some cases, the storage medium might be incorporated within the computational system 500 or in communication with the computational system 500. In other embodiments, the storage medium might be separate from a computational system 500 (e.g., a removable medium, such as a compact disc, etc.), and/or provided in an installation package, such that the storage medium can be used to program a general purpose computer with the instructions/code stored thereon. These instructions might take the form of executable code, which is executable by the computational system 500 and/or might take the form of source and/or installable code, which, upon compilation and/or installation on the computational system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs the computational system 500 to perform methods of the invention. According to a set of embodiments, some or all of the procedures of such methods are performed by the computational system 500 in response to processor 510 executing one or more sequences of one or more instructions (which might be incorporated into the operating system 540 and/or other code, such as an application program 545) contained in the working memory 535. Such instructions may be read into the working memory 535 from another machine-readable medium, such as one or more of the storage device(s) 525. Merely by way of example, execution of the sequences of instructions contained in the working memory 535 might cause the processor(s) 510 to perform one or more procedures of the methods described herein.

The terms "machine-readable medium" and "computer readable medium", as used herein, refer to any medium that participates in providing data that causes a machine to operate in a specific fashion. In an embodiment implemented using the computational system 500, various machine-readable media might be involved in providing instructions/code to processor(s) 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 525. Volatile media includes, without limitation, dynamic memory, such as the working memory 535. Transmission media includes coaxial cables, copper wire and fiber optics, including the wires that comprise the bus 505, as well as the various components of the communication subsystem 530 (and/or the media by which the communications subsystem 530 provides communication with other devices).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 500. The communications subsystem 530 (and/or components thereof) generally will receive the signals, and the bus 505 then might carry the signals (and/or the data, instructions, etc., carried by the signals) to the working memory 535, from which the processor(s) 505 retrieves and executes the instructions. The instructions received by the working memory 535 may optionally be stored on a storage device 525 either before or after execution by the processor(s) 510.

It will be appreciated that the systems described with reference to FIGS. 1-5, including the computational system 500 of FIG. 5, may be used to implement a number of methods. Some of these methods are discussed with reference to FIGS. 6-9. For the sake of clarity, embodiments of the methods may be discussed with reference to the illustrative system components of FIGS. 1-5. It will be appreciated that these descriptions should not be construed as limiting the scope of the methods or of the components described with reference to the methods.

Figure 6:
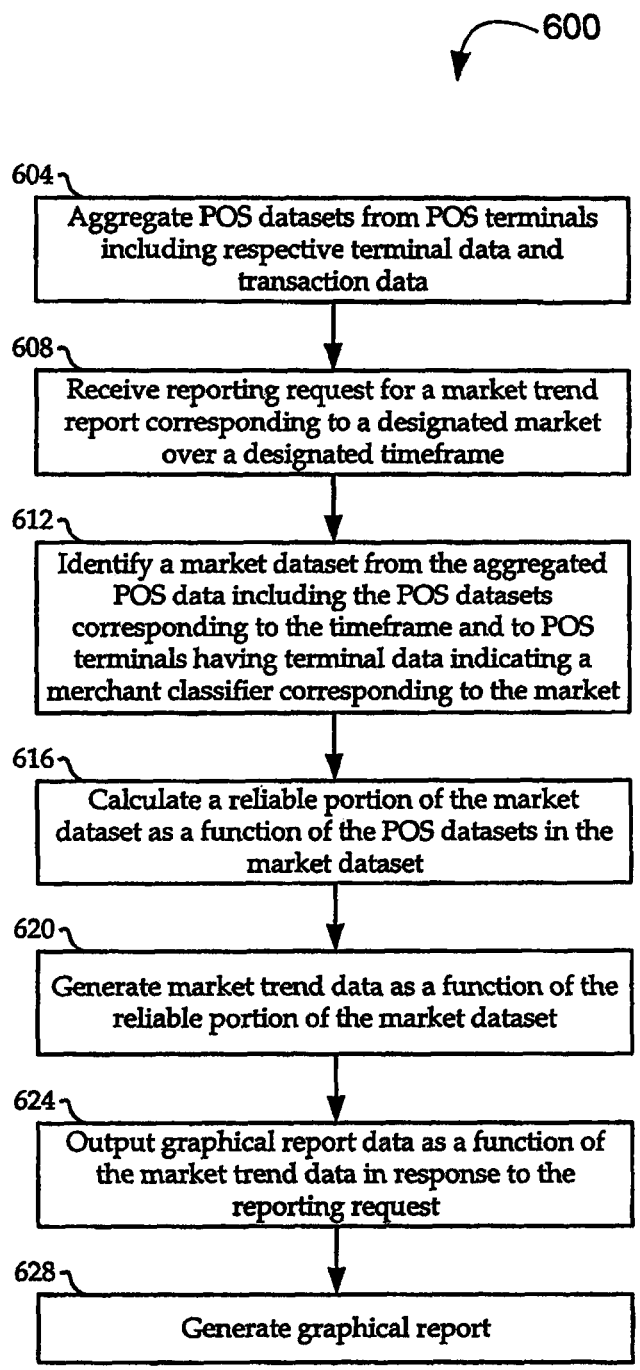
FIG. 6 shows a flow diagram illustrating a method for generating a graphical report, according to various embodiments.

FIG. 6 shows a flow diagram illustrating a method 600 for generating a graphical report, according to various embodiments. The method 600 begins at block 604 by aggregating POS datasets from POS terminals. For example, the aggregation subsystem 140 of the service provider 105 may be used to generate aggregated POS data 240 from a number of POS terminals 120. The aggregated POS data 240 may include transaction data 210, terminal data 220, and/or authorization data 230.

In some embodiments, at block 608, a request is received for a market trend report. The requested market trend report may correspond to a designated timeframe, a designated market, and/or any other designations. For example, the requested report may designate the hotels market over the past twelve months. Alternately, the requested report may designate all markets for the northwest region of the United States over the past sixty days. In various embodiments, the request may originate from a user using a report user device 175 via an interface subsystem 170, via a computer-generated request for updating a website or generating a periodic mailing, etc.

At block 612, a market dataset may be identified or generated from the aggregated POS data 240, for example, according to the request received in block 608. In some embodiments, market data 250 is generated from the aggregated POS data 240 including the POS datasets 245 corresponding to the designated timeframe(s) and to POS terminals 120 having terminal data 220 indicating a merchant classifier corresponding to the designated market(s).

As discussed above, it may be desirable to use only a reliable portion of the market dataset identified or generated in block 612. For example, POS datasets 245 from POS terminals 120 having transaction data 210 for only a portion of the timeframe may be ignored or treated differently (e.g., displayed with special indications and not used in calculating certain trends). At block 616, a reliable portion of the market dataset may be calculated as a function of the POS datasets in the market dataset. For example, only same store data, only data having a statistically insignificant variability from a baseline, etc. may be included in the reliable portion.

At block 620, market trend data may be generated as a function of the reliable portion of the market dataset. In some embodiments, additional data is generated and/or collected, such as correlation data 270, trend analysis data 280, template data 290, etc. Graphical report data may then be generated and output at block 624 as a function of the market trend data (e.g., in response to the reporting request received in block 608). In some embodiments, the graphical report data is used to generate a graphical report at block 628.

It will be appreciated that various modifications may be made to the method 600 without departing from the scope of embodiments. Also, various embodiments of sub-processes may be used to implement certain process blocks of the method 600. Embodiments of some of these sub-processes are described with reference to FIGS. 7-9.

Figure 7A:
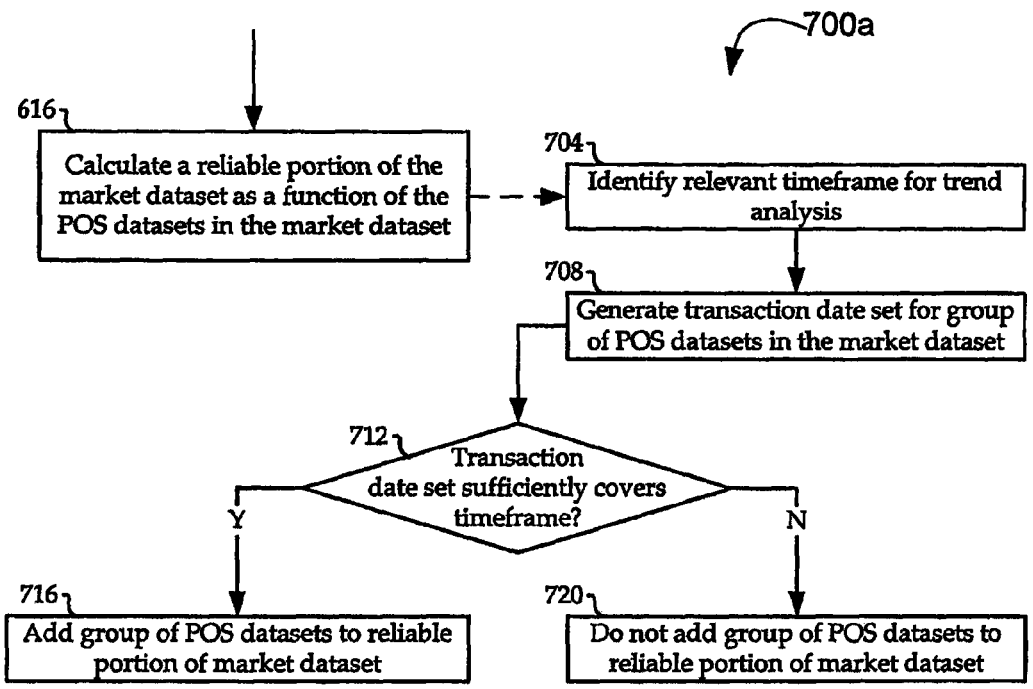
FIGS. 7A and 7B show flow diagrams of two illustrative methods for calculating a reliable portion of the market dataset, according to various embodiments.
Figure 7B:
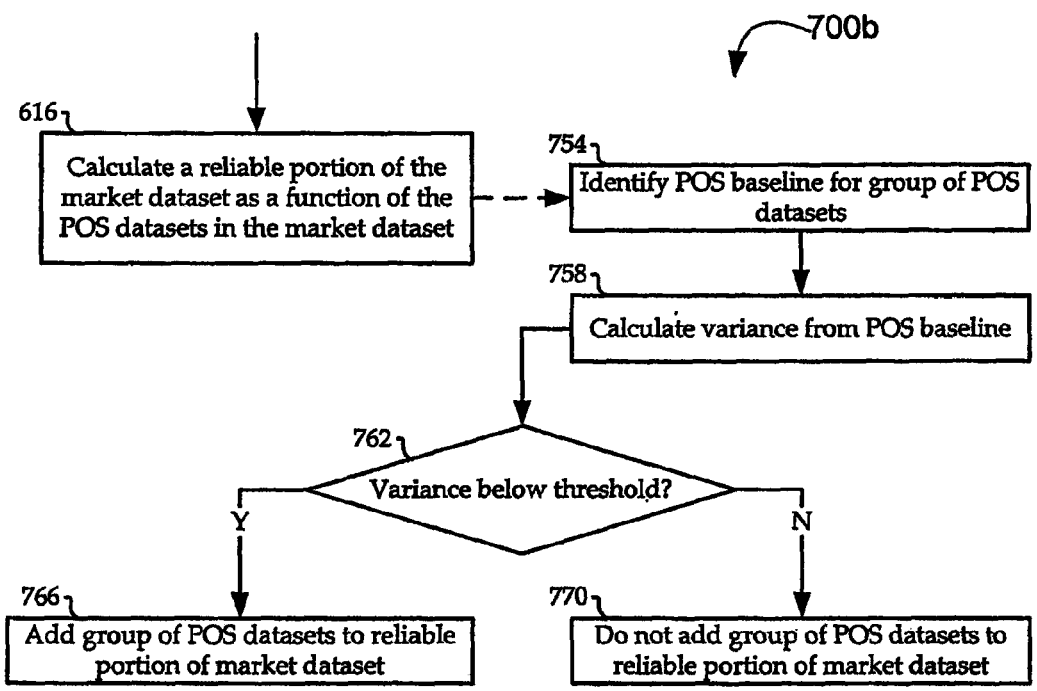

FIGS. 7A and 7B show flow diagrams of two illustrative methods 700 for calculating a reliable portion of the market dataset, according to various embodiments. Embodiments of the method 700a of FIG. 7A begin, as one embodiment of block 616 of the method 600 of FIG. 6, at block 704 by identifying a relevant timeframe for analysis. At block 708, the market data 250 (e.g., or POS datasets 245 that are used as part of the market data 250) are evaluated to determine a transaction date set. The transaction date set indicates the set of transaction dates (e.g., a date range, transactions per date, etc.) covered by the transactions included in the market data 250.

At block 712, a determination may be made as to whether the transaction date set sufficiently covers the timeframe of interest. In one embodiment, the transaction date set is evaluated only to see if data is available from the beginning and the end of the time frame. In other embodiments, techniques are used to determine if enough transaction data 210 is available for all or part of the timeframe. For example, it may be desirable to only treat the data as reliable when a certain average transaction density is seen across the entire timeframe.

If it is determined at block 712 that the transaction date set sufficiently covers the timeframe of interest, the corresponding POS datasets 245 (e.g., or data derived from the respective POS datasets 245) may be added to (e.g., or may not be removed from) the reliable portion of the market data 250 at block 716. If it is determined at block 712 that the transaction date set does not sufficiently cover the timeframe of interest, the corresponding POS datasets 245 (e.g., or data derived from the respective POS datasets 245) may not be added to (e.g., or may be removed from) the reliable portion of the market data 250 at block 720.

Embodiments of the method 700b of FIG. 7B begin, as another embodiment of block 616 of the method 600 of FIG. 6, at block 754 by identifying a POS baseline for a group of POS datasets 245. For example, if certain POS terminals 120 were used in certain merchant outlets 115 in January 2009, data from those POS terminals 120 may be used as the baseline for a same store report for January 2010. At block 758, a statistical variation (e.g., an amount of variation) may be calculated between the POS baseline and the market data 250. For example, it may be determined that a certain amount of change is allowed from the baseline without considering the new data unreliable.

At block 762, a determination may be made as to whether the amount of variation is below a certain allowable threshold. If it is determined at block 762 that the amount of variation is below the threshold, the corresponding POS datasets 245 (e.g., or data derived from the respective POS datasets 245) may be added to (e.g., or may not be removed from) the reliable portion of the market data 250 at block 766. If it is determined at block 762 that the amount of variation is below the threshold, the corresponding POS datasets 245 (e.g., or data derived from the respective POS datasets 245) may not be added to (e.g., or may be removed from) the reliable portion of the market data 250 at block 770.

Figure 8:
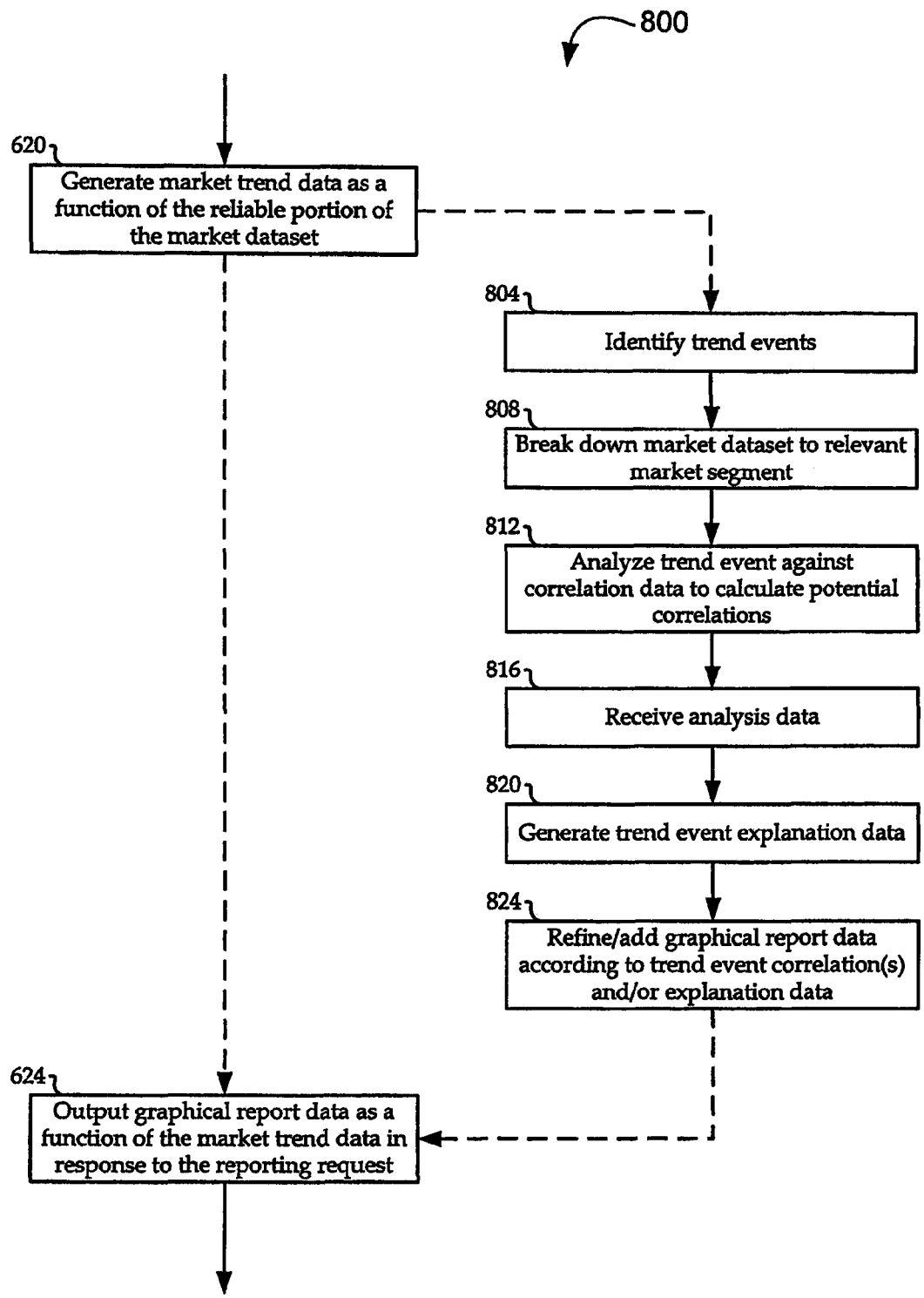
FIG. 8 shows a flow diagram of an illustrative method for generating market trend data, according to various embodiments.

Once the reliable portion of the market data 250 has been generated (e.g., by one of the methods 700 of FIG. 7A or 7B, or by some other method), it may be desirable to generate market trend data accordingly. FIG. 8 shows a flow diagram of an illustrative method 800 for generating market trend data (e.g., report data 260), according to various embodiments. Embodiments of the method 800 begin at block 804, as one embodiment of block 620 of the method 600 of FIG. 6, by identifying one or more trend events, as described above.

At block 808, the one or more trend events may be analyzed according to relevant market data 250 (or relevant data from the reliable portion of the market data 250). In one embodiment, the market data 250 is broken down by market segment for a relevant timeframe. For example, the reliable portion of the market data 250 may be filtered such that only merchants in the gasoline classification are analyzed. In certain embodiments, breaking down the market data 250 may include identifying relevant trend events from block 804 and their corresponding market data 250 from block 808.

The trend events identified in block 804 may then be analyzed against correlation data 270 (e.g., and/or any other useful types of data) in block 812 to calculate (e.g., and/or otherwise identify) potential correlations. For example, a statistically significant correlation may be found between a rise in same store average ticket value for merchants in a region and a rise in median home prices for the same region. In some embodiments, other data, like trend analysis data 280, may be received at block 816. The correlation data 270, trend analysis data 280, identified trend events, identified correlations, etc. may be used in block 820 to generate trend explanations. For example, the trend explanations may include auto-generated text, text supplied by analysts 165, etc.

It is worth noting that trend explanations may include a market driver analysis. For example, after identifying a trend event in block 804, a human or machine-implemented analyst may determine whether the trend event is legitimate (e.g., not simply evidence of an anomaly, mismatch, mathematical error, data error, etc.). The breakdown of the data in block 808 may include breaking down the data by market and then by merchant to determine what contributory effect each merchant may have on a trend or a particular trend event. The contributory effect of the particular merchant may be used to help explain trends, trend events, etc.

For example, suppose fast food sales show a small decline in March. A market driver analysis shows that a fast food chain called Burger Hut had a statistically large contributory impact on the trend event. Correlation data 270 indicates that Burger Hut was involved in a meat scare during a week in March, and aggregated POS data 240 supports a precipitous drop in sales for that week across Burger Hut merchant outlets 115. The data may justify a trend explanation stating that the small decline for the industry should be ignored, as the major contributing factor was a single meat scare for a single merchant, which has since been resolved.

Some or all of the data used in and generated by block 820 may then be used to affect graphical report data 260 in block 824. For example, the graphical report data 260 may be updated, refined, supplemented, etc. according to the trend event correlations, trend explanations, etc. The graphical report data 260 may then be output, for example, according to block 624 of the method 600 of FIG. 6.

Figure 9:
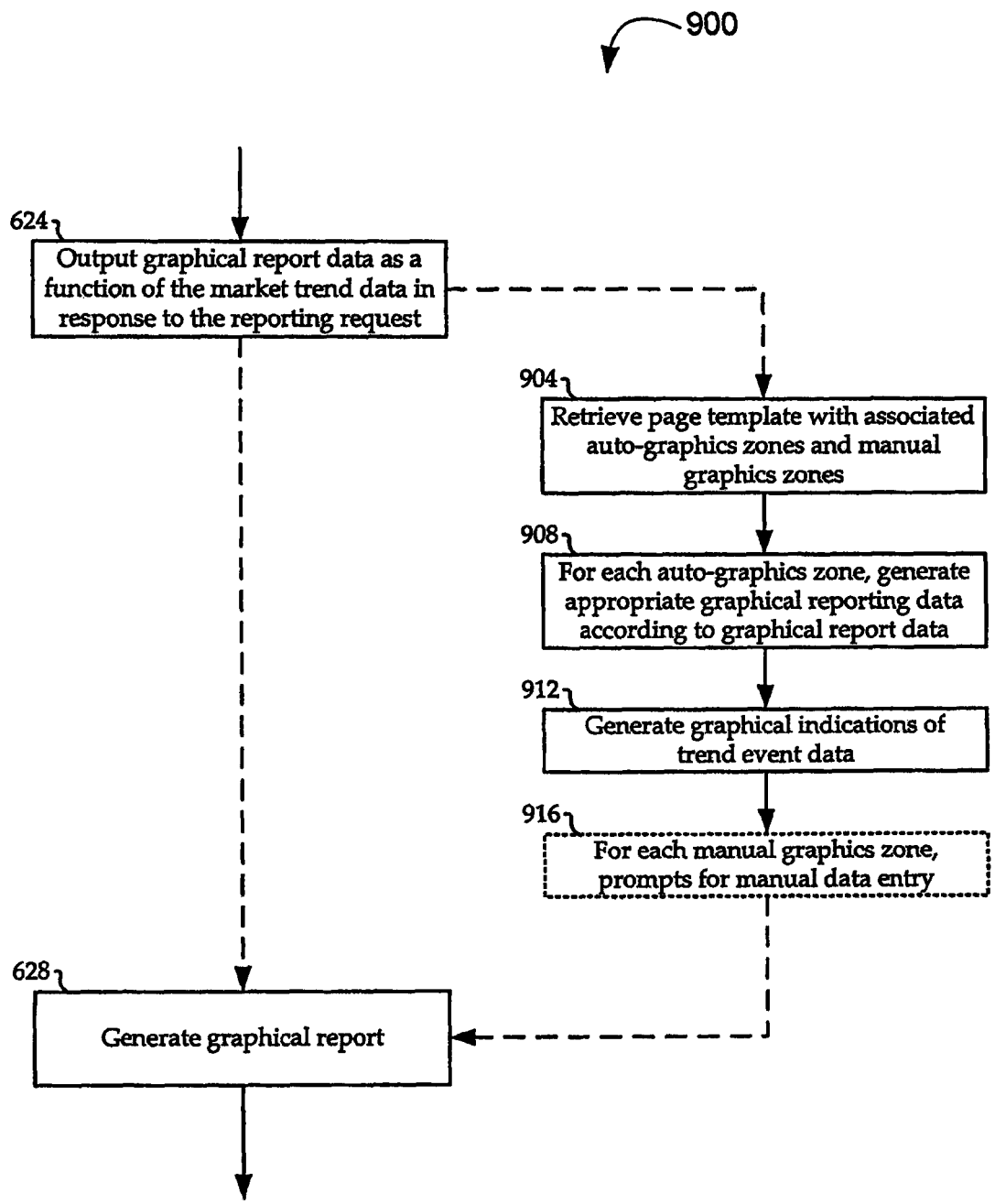
FIG. 9 shows a flow diagram of an illustrative method for outputting graphical report data, according to various embodiments.

In various embodiments, the graphical report data 260 is output according to the method 900 shown in FIG. 9. Embodiments of the method 900 begin at block 904, as one embodiment of block 624 of the method 600 of FIG. 6, by retrieving template data 290, as described above. In some embodiments, the template data 290 includes various types of zones. For example, auto-graphics zones may be used to automatically place (e.g., format, position, generate, etc.) content (e.g., text, graphics, embedded objects, etc.). Manual graphics zones may be used for manual placement of content. For example, manual placement zones may include prompts for manual input, spaces left for entry of text by analysts 165, etc. Of course, other types of zones and elements of a template are possible. For example, some templates may allow content to be manually added to auto-graphics zones, etc.

At block 908, appropriate graphical reporting data may be generated for each auto-graphics zone according to graphical report data. Graphical indications of trend event data (e.g., highlighting, icons, coloration, circles, etc.) may then be generated and/or placed at block 912. In some embodiments, at block 916, the method 900 may prompt a reporter (e.g., an analyst, etc.) for manual data entry into some or all of the manual graphics zones, where appropriate. As discussed above, in some embodiments, the graphical report data 260 may then be used to generate a graphical report, for example, according to block 628 of the method 600 of FIG. 6. For example, the report may be generated as a webpage, as a PDF document for communication over newswires, as an email, as a paper mailing, etc.

It will be appreciated that many different types of market data 250, report data 260, report outputs 400, etc. can be generated using embodiments, such as those described above. For example, any of the market data as previously described may be used to produce reports showing the use of various payment instruments or card types used in transactions and whether those uses are increasing or decreasing. As another example, reports may be produced showing the card association or payment networks used to process the various transactions and whether these transactions are increasing or decreasing relative to a reference time frame. These types of reports may be further categorized using any of the categories described herein, including by geographical region, by industry, such as by merchant classification codes, and the like. In so doing, any of the systems previously described herein may be used to capture point of sale transactions, process the transactions, and generate the relevant reports.

Figure 10:
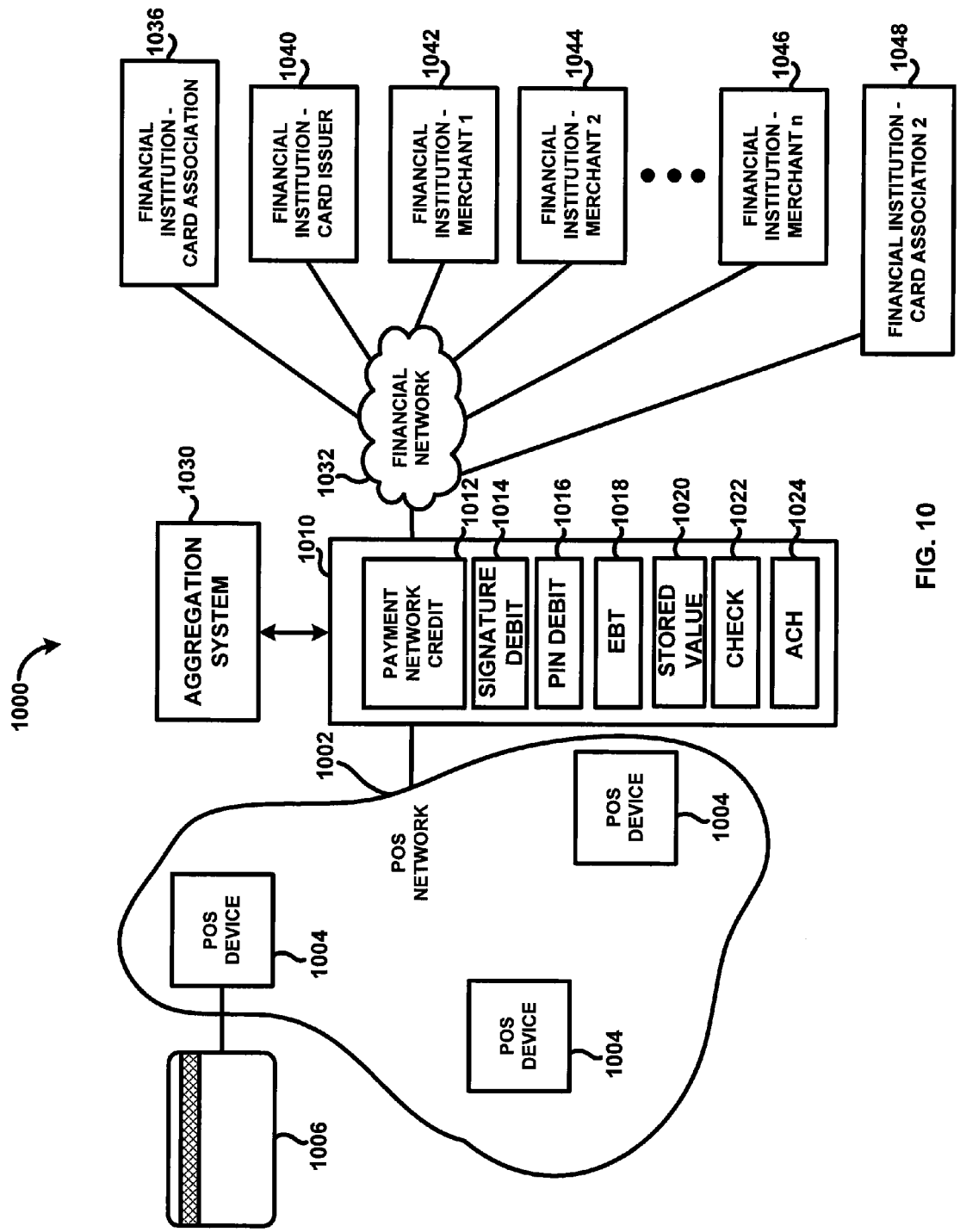
FIG. 10 is a schematic diagram of another embodiment of a market network.

For example, FIG. 10 is a schematic diagram of another embodiment of a market network 1000 that may be used to process transactions from point of sale devices using a variety of payment instruments, payment or processing networks and other financial networks. As shown, network 1000 includes a POS network 1002 to which a variety of POS devices 1004 are in communication. POS network 1002 and POS devices 1004 may be similar to the other POS networks and POS devices described herein. As is known in the art, a payment instrument 1006 may be used to interact with the POS devices 1004 and may comprise any of those payment instrument types described herein. Transactions from POS network 1002 pass to a payment network 1010 for subsequent processing. Payment network 1010 may comprise a variety of specific types of payment networks, such as a credit network 1012, a signature debit network 1014, a PIN debit network 1016, an EBT network 1018, a stored value network 1020, a check network 1022 and an ACH network 1024, among others. These may all be part of the same payment network or may be individual networks that can be coupled to POS network 1002. In other words, transactions from POS devices 1004 may be routed to any of a variety of payment networks depending on the payment instrument type, contracts with the merchant, pricing schemes, and the like. Further, the POS transaction data may also be provided to an aggregation system 1030 that may be similar to the other aggregation systems described herein. The data may come directly from POS network 1002 or from payment network 1010. The POS transaction data that is aggregated at aggregation system 1030 may be processed similar to any of the other embodiments described herein to produce the appropriate reports.

The POS transactions pass from payment network 1010 to a financial network 1032 that may comprise any of the financial networks described herein. From there, various institutions, associations, and the like may be used to process the transactions in an appropriate manner similar to any of the embodiment described herein. Merely by way of example, financial network 1032 may route the transactions to any one of a variety of financial institution card associations, such as a first card association 1036, a second card association 1048 and so forth. Other options include a financial institution card issuer 1040, or any one of a variety of financial institution merchants, such as merchants 1042, 1044, 1046. Hence, transactions originating with POS devices 1004 may be processed using a variety of payment networks and financial institutions, including various financial networks, card associations, card issuers, merchants, and the like. What is common to all of these transactions is that the aggregation system 1030 is able to collect and aggregate POS transaction data according to certain categories and classifications. For example, the data may be categorized by the particular payment instrument or card type that was used in the transaction as well as the payment networks, financial networks, card associations, card issuers, merchant processors, and the like that handle the transactions. Further, any of the other POS transaction data previously described herein may also be captured by aggregation system 1030. Using this data, a variety of reports may be produced using any of the techniques described herein. Specific examples of some of these reports will be described hereinafter.

Figure 11:
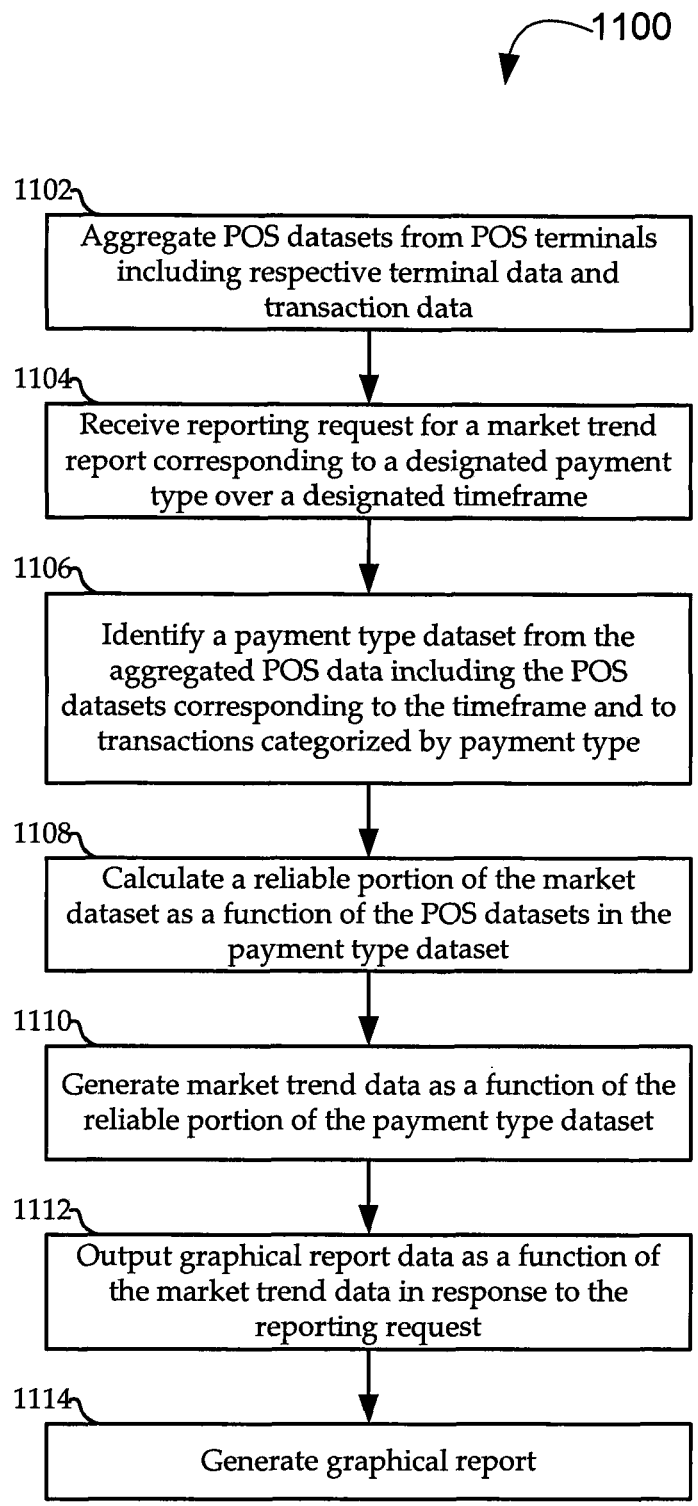
FIG. 11 is a flow chart illustrating a method for generating a graphical report, according to various embodiments.

For example, FIG. 11 illustrates one method for generating market trend reports illustrating information such as payment types and transaction processing associations. The process begins at step 1102 where POS data sets are aggregated from POS terminals. This data includes terminal data and transaction data. These data sets may be aggregated in a manner similar to that described with previous embodiments. At step 1014, a request is received for a market trend report corresponding to a designated payment type over a designated time frame. For example, a request may be to report on a transaction mix using various payment types such as credit cards, signature debit cards, PIN debit cards, EBT, and the like. The payment type may also relate to the payment network used to process the transactions to determine market trends for both payment type and payment network.

In step 1106, a payment type data set is identified from the aggregated POS data including the POS data sets corresponding to the time frame and to transactions categorized by payment type. In this way, payment type data sets may be identified and categorized according to payment type. Optionally, a reliable portion of the market data set may be calculated as a function of the POS data sets in the payment type data step as shown in step 1108. This reliable portion may be calculated similar to other embodiments described herein. In step 1110, market trend data is generated as a function of the reliable portion of the payment type data set. In step 1112, graphical report data is output as a function of the market trend data in response to the reporting request. Further, in step 1114 a graphical report is generated. Hence, using this process various reports may be produced showing transactions based on payment type and/or payment network and whether these are increasing or decreasing relative to a specified time frame.

Figure 12:
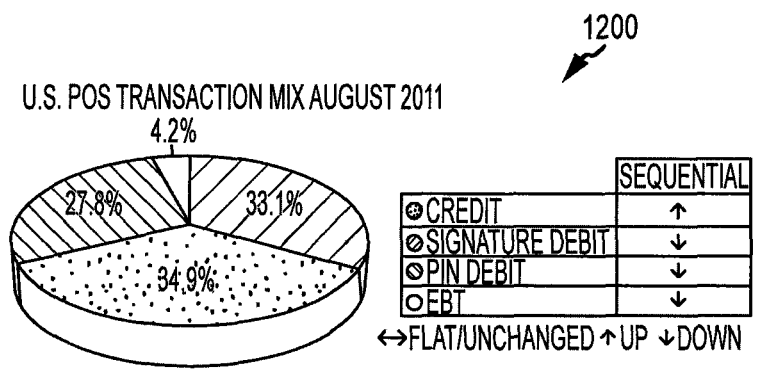
FIG. 12 illustrates one report showing percentages of transactions according to payment type.

FIG. 12 illustrates one report 1200 showing percentages of transactions according to payment type. This report may be produced using any of the processes described herein. Further, similar to the other reports described herein, the report may be produced in electronic form, such as being displayed on a display screen of a computer, as a text message, in paper form, or the like. In report 1200, a POS transaction mix is illustrated. In other words, shown are the percentages of each type of payment type in terms of numbers of transactions. For example, credit transactions (such as those involving the use of credit cards) amounted to 34.9 percent of the total transactions for the month of August. Similarly, 33.1 percent of all of the POS transactions in terms of numbers of transactions were signature debit transactions. A chart using arrows as symbols also describes whether, for each payment type, the numbers of transactions increased or decreased relative to a previous point in time. For example, a comparison may be made with the same month of the previous year. In this case, the comparisons would be with the transaction mix occurring in August 2010, with the arrows showing whether the August 2011 transactions increased or decreased or remained unchanged.

Figure 13:
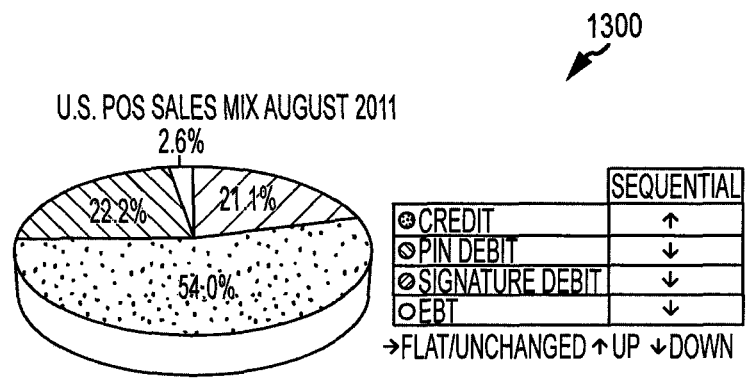
FIG. 13 illustrates another report showing percentages of sales volumes according to payment type.

FIG. 13 illustrates a report showing percentages of sales volumes according to payment type and is noted by reference numeral 1300. Report 1300 is similar to report 1200 except that in report 1300 the numbers are shown in terms of total dollar volumes rather in numbers of transactions as is illustrated in FIG. 12. For example, in August 2011, the total percentage of credit card transactions in terms of dollar volume was 54 percent. Further, the credit transactions were up relative to the transaction mix of August 2010.

Figure 14:
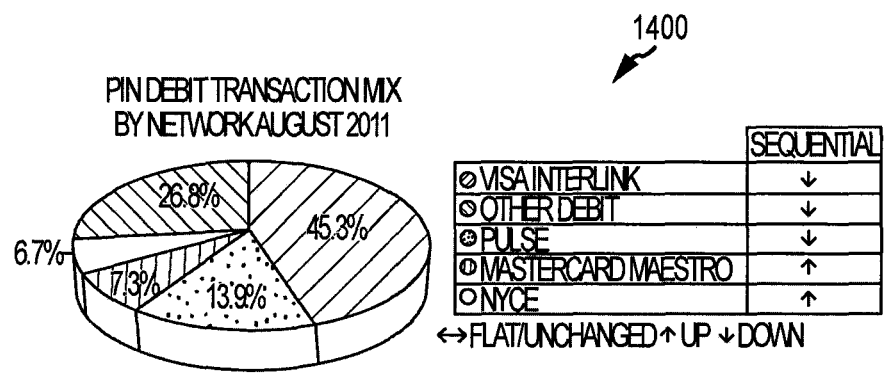
FIG. 14 illustrates a report showing percentages of transactions for PIN debit cards according to payment network.

FIG. 14 illustrates a report 1400 showing PIN debit transactions according to payment network for a given month, such as August 2011. The transaction mix is shown in terms of percentages of numbers of transactions occurring over each payment network. For example, the percentage of PIN debit transactions occurring over the VISA Interlink network was 45.3 percent in terms of numbers of transactions. Further, the percentage occurring over the VISA Interlink network decreased relative to PIN debit transactions in August 2010.

Figure 15:
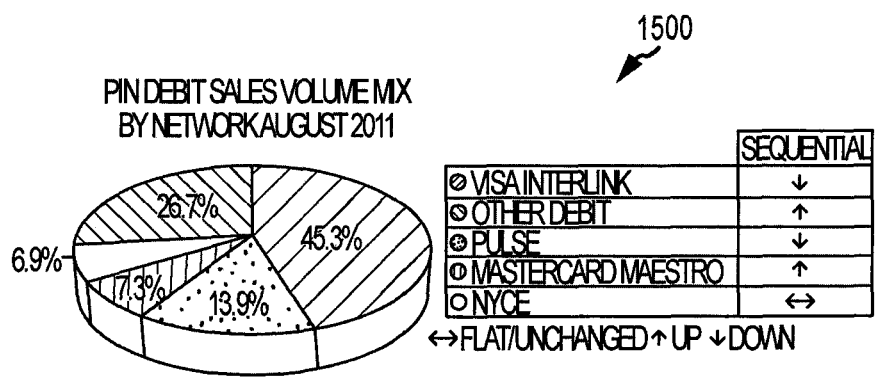
FIG. 15 illustrates a report showing percentages of sales volumes for PIN debit cards according to payment network.

FIG. 15 illustrates a report 1500 that is similar to report 1400 except that the PIN debit sales are shown in terms of dollar volumes. For example, in August 2011 45.3 percent of the total dollar volume of PIN debit sales occurred over the VISA Interlink network. Further, the PIN debit sales by dollar volume over the VISA Interlink network decreased relative to the previous August.

Figure 16:
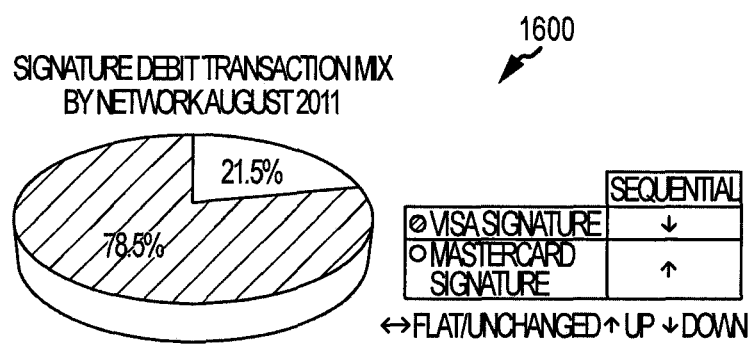
FIG. 16 illustrates a report showing percentages of transactions for signature debit cards according to payment network.
Figure 17:
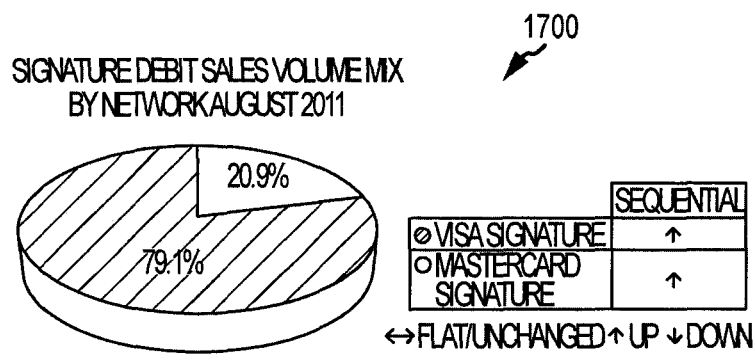
FIG. 17 illustrates a report showing percentages of sales volumes for signature debit cards according to payment network.
Figure 18:
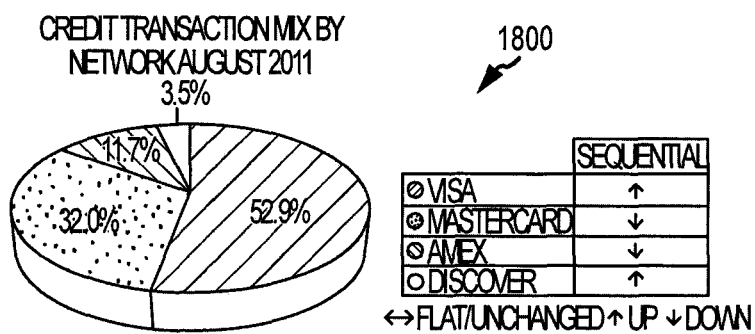
FIG. 18 illustrates a report showing percentages of transactions for credit cards according to payment network.
Figure 19:
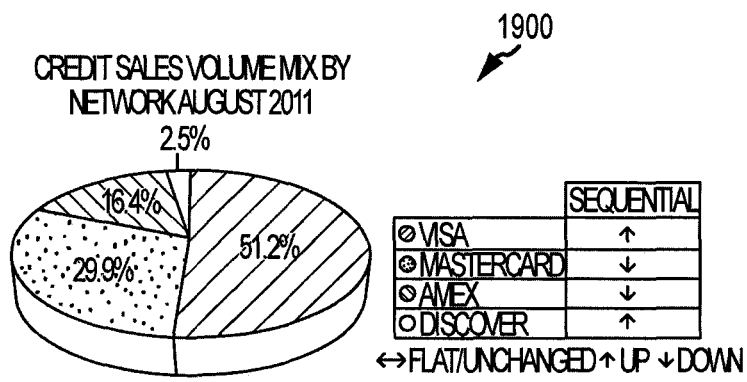
FIG. 19 illustrates a report showing percentages of sales volumes for credit cards according to payment network.

FIGS. 16 and 18 describe reports similar to FIG. 14 except for they involve signature debit transactions and credit transactions, respectively. Similarly, FIGS. 17 and 19 are similar to the report shown in FIG. 15 except that they describe the use of signature debit transactions and credit transactions, respectively. More specifically, FIG. 16 illustrates a report 1600 showing the percentage of signature debit transactions by payment network for the month of August 2011 and whether these increased or decreased relative to the previous August. FIG. 17 illustrates a report 1700 showing the percentage of total dollar volume sales for signature debit transactions based on payment network for the month of August 2011. The report also shows whether these total sales increased or decreased by payment network relative to the previous August.

FIG. 18 illustrates a report 1800 showing the mix of credit transactions by payment network for the month of August 2011 in terms of percentages of numbers of transactions. Also, the report shows whether the numbers are increasing or decreasing by payment network relative to the previous August.

FIG. 19 illustrates a report 1900 showing the credit sales volume mix by payment network for August 2011. This is for total dollar volume sales per payment network. Also, the report shows whether the total dollar volume by network is increasing or decreasing relative to the previous August.

Figure 20:
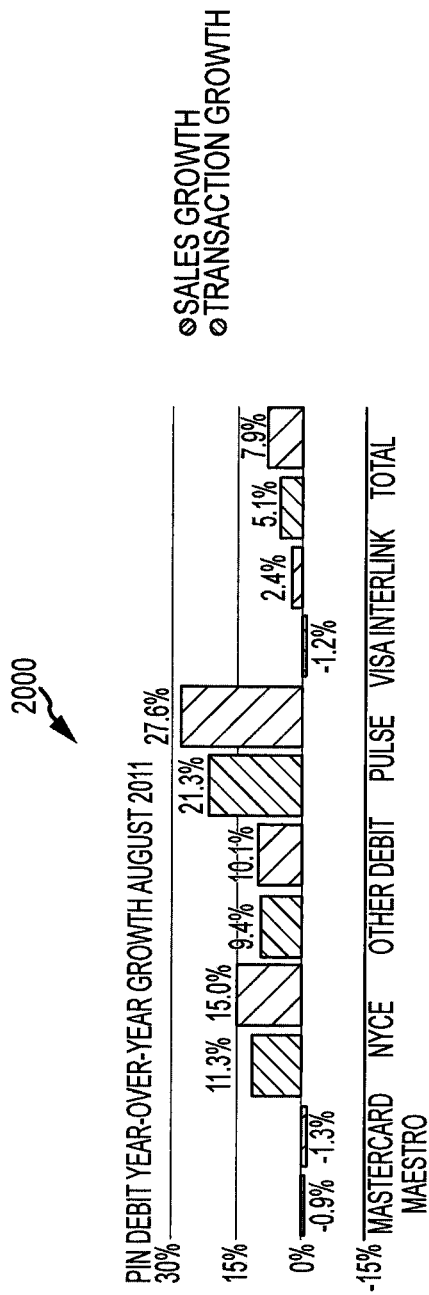
FIG. 20 illustrates a report showing year over year growth for PIN debit transactions according to payment network.
Figure 21:
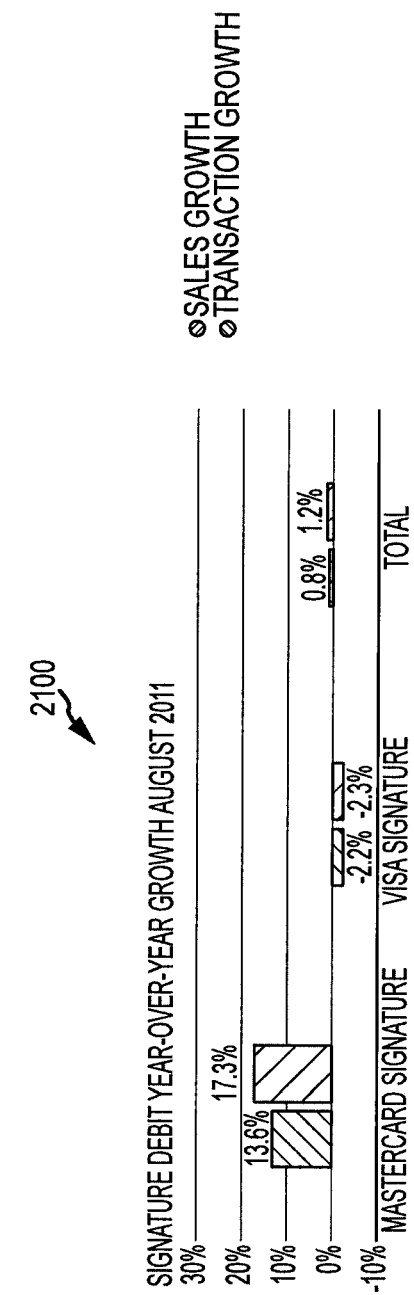
FIG. 21 illustrates a report showing year over year growth for signature debit transactions according to payment network.
Figure 22:
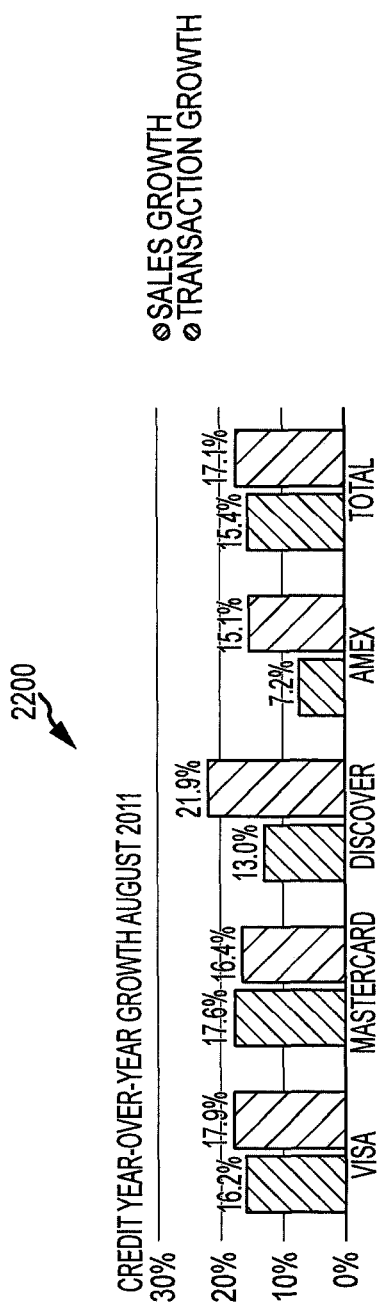
FIG. 22 illustrates a report showing year over year growth for credit transactions according to payment network.

FIGS. 20-22 illustrate various reports showing year over year growth for certain payment types according to payment network. For example, FIG. 20 illustrates a report 2000 comparing the year over year growth for PIN debit transactions according payment network. The comparison is for August 2011 compared to August 2010. Further, the growth is illustrated in terms of numbers of transactions and total dollar volume sales growth. The payment networks include Master-Card, NYCE, other debit, PULSE, VISA Interlink and a total. However, it will be appreciated that other payment networks could also be included.

FIG. 21 illustrates a report 2100 showing year over year growth for signature debit transactions. These are shown for both numbers of transactions and total dollar volume sales. The comparison is from August 2011 to August 2010 and is shown for two types of payment networks.

FIG. 22 illustrates a report 2200 showing year over year growth for credit transactions based on payment network. This is shown for both numbers of transactions and total dollar volume sales.

Figure 23:
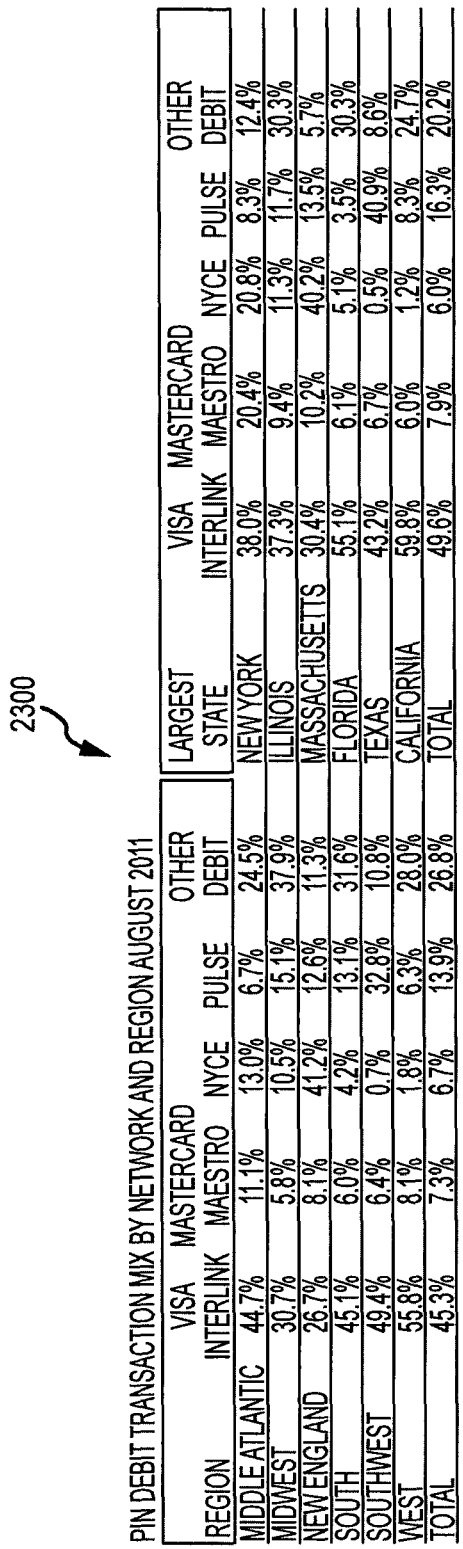
FIG. 23 illustrates a report showing PIN debit transactions according to payment network and geographic region.

FIG. 23 illustrates a report 2300 showing PIN debit transactions according to payment network and further broken down by geographic region. This is shown for total numbers of transactions by payment network for the month of August 2011. Further, the regions may be broken down into regions such as middle Atlantic, mid-West, New England, South, Southwest, the West. However, they may also be broken down in smaller categories, such as individual states or even cities.

FIG. 24 illustrates a report 2400 showing signature debit transactions according to payment network and geographic region. A similar report 2500 is shown in FIG. 25 for credit transactions by payment network and region. Reports 2400 and 2500 are similar to report 2300 except that they are shown for signature debit transactions and credit transactions.

FIG. 26 illustrates a report 2600 showing PIN debit transactions according to payment network over a twelve month period. For example, in August 2010, the number of PIN debit transactions occurring over the VISA Interlink Network was 48.2 percent. The opposite end of the report shows that this amount dropped to 45.3 percent in August 2011. Further, quarterly reports are also illustrated for each of the payment network types. FIG. 27 illustrates a report 2700 that is similar to report 2600 except that the payment type is signature debit transactions. In a similar manner, FIG. 28 shows a report similar to report 2600 except that report 2800 is for credit transactions by payment network.

Figure 29:
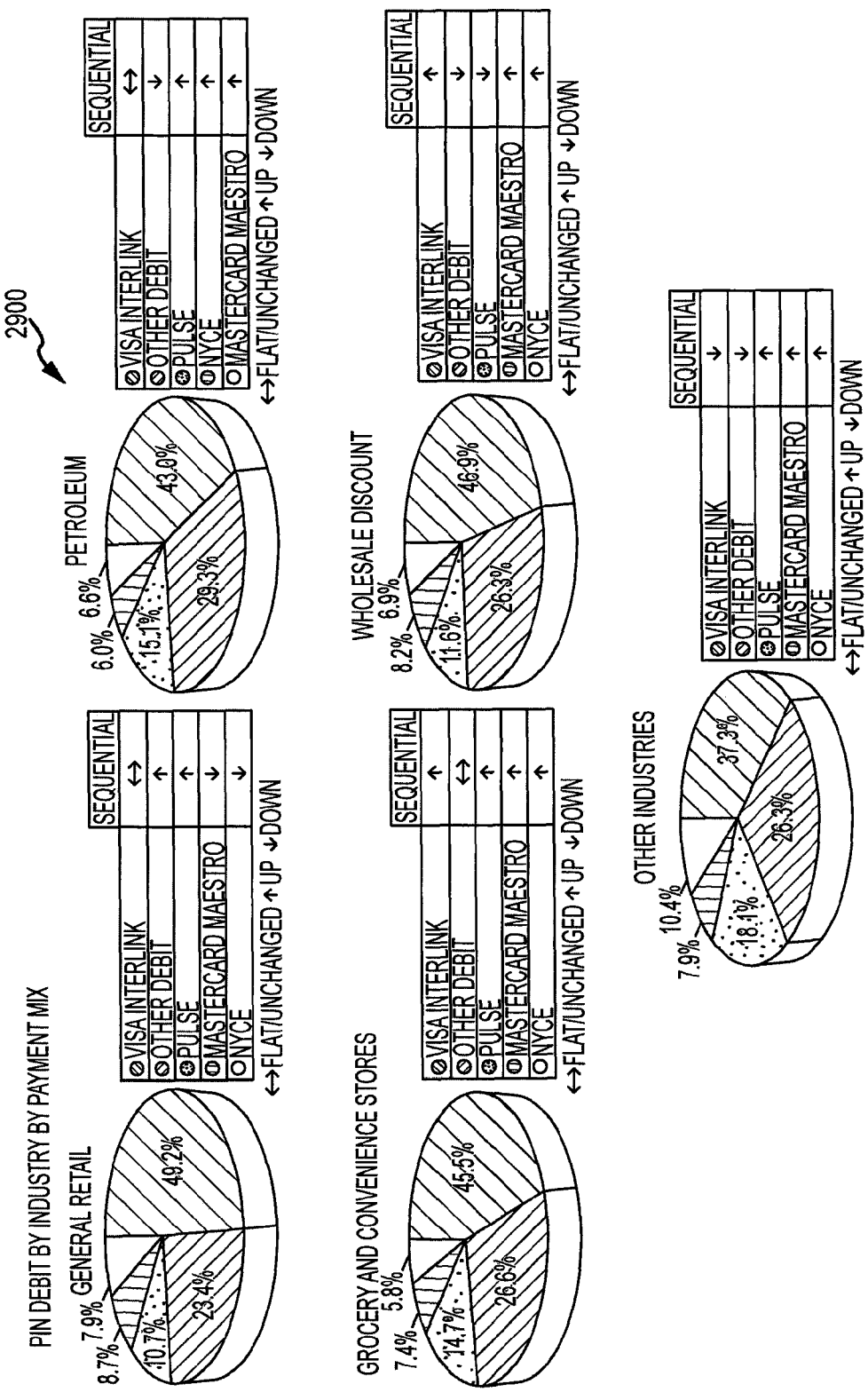
FIG. 29 illustrates a report showing PIN debit transactions according to payment network and by industry.

FIG. 29 illustrates a report 2900 showing PIN debit transactions according to payment network and by industry. For example, report 2900 shows a graph illustrating the payment mix by general retail stores for PIN debit transactions. This is by numbers of transactions according to payment network. For instance, of the PIN debit transactions, 49.2 percent occurred over the VISA Interlink Network for general retail stores. Further, the number of transactions remained flat relative to the month of the previous year. Similar reports are shown for other industry types, such as petroleum, grocery and convenience stores, wholesale discount, and other industries. These industries may be categorized based on predefined rules and can be determined from the point of sale terminal transaction data based on such codes, such as a merchant identifier, merchant classification code, and the like.

Figure 30:
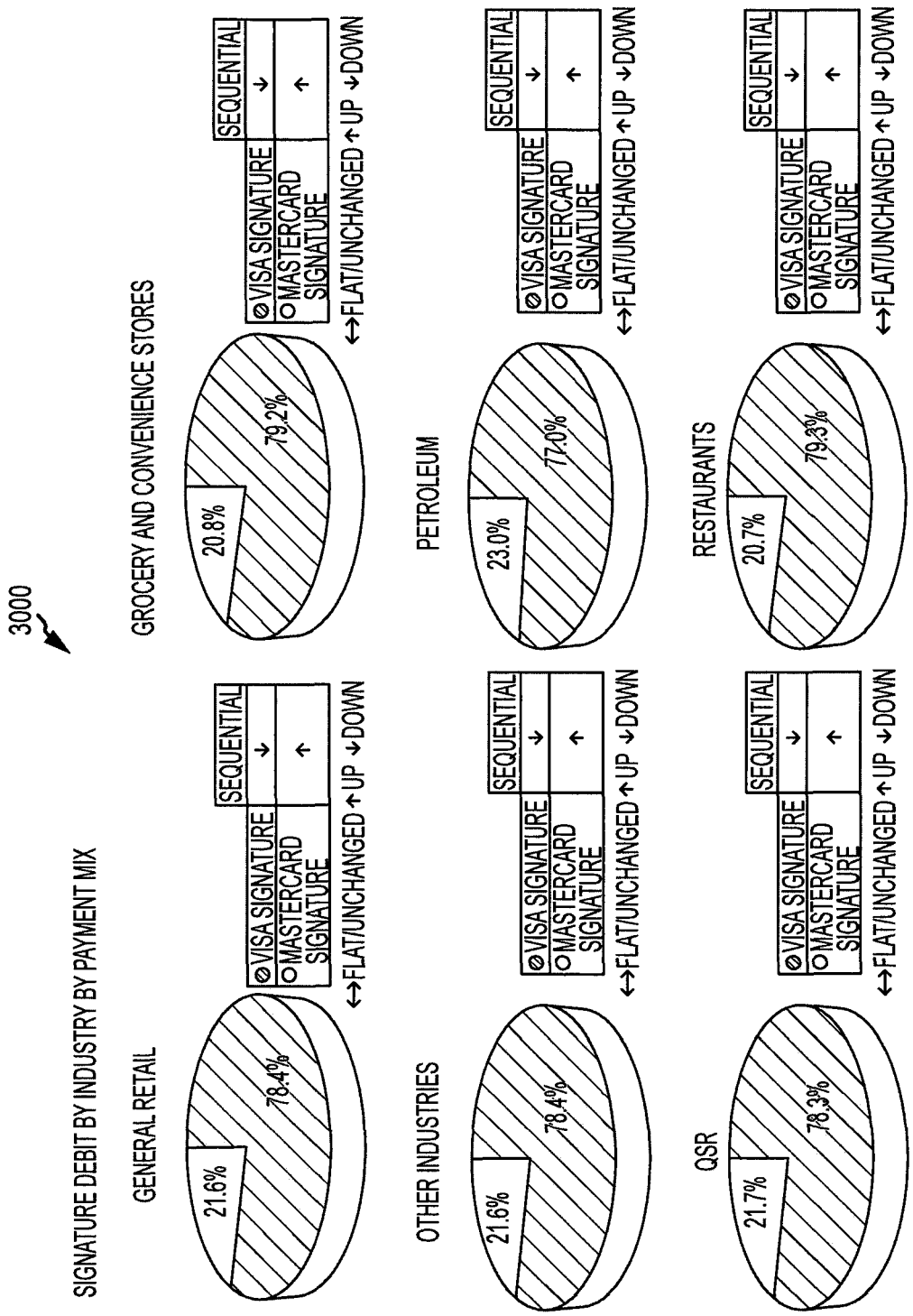
FIG. 30 illustrates a report showing signature debit transactions according to payment network and by industry.
Figure 31:
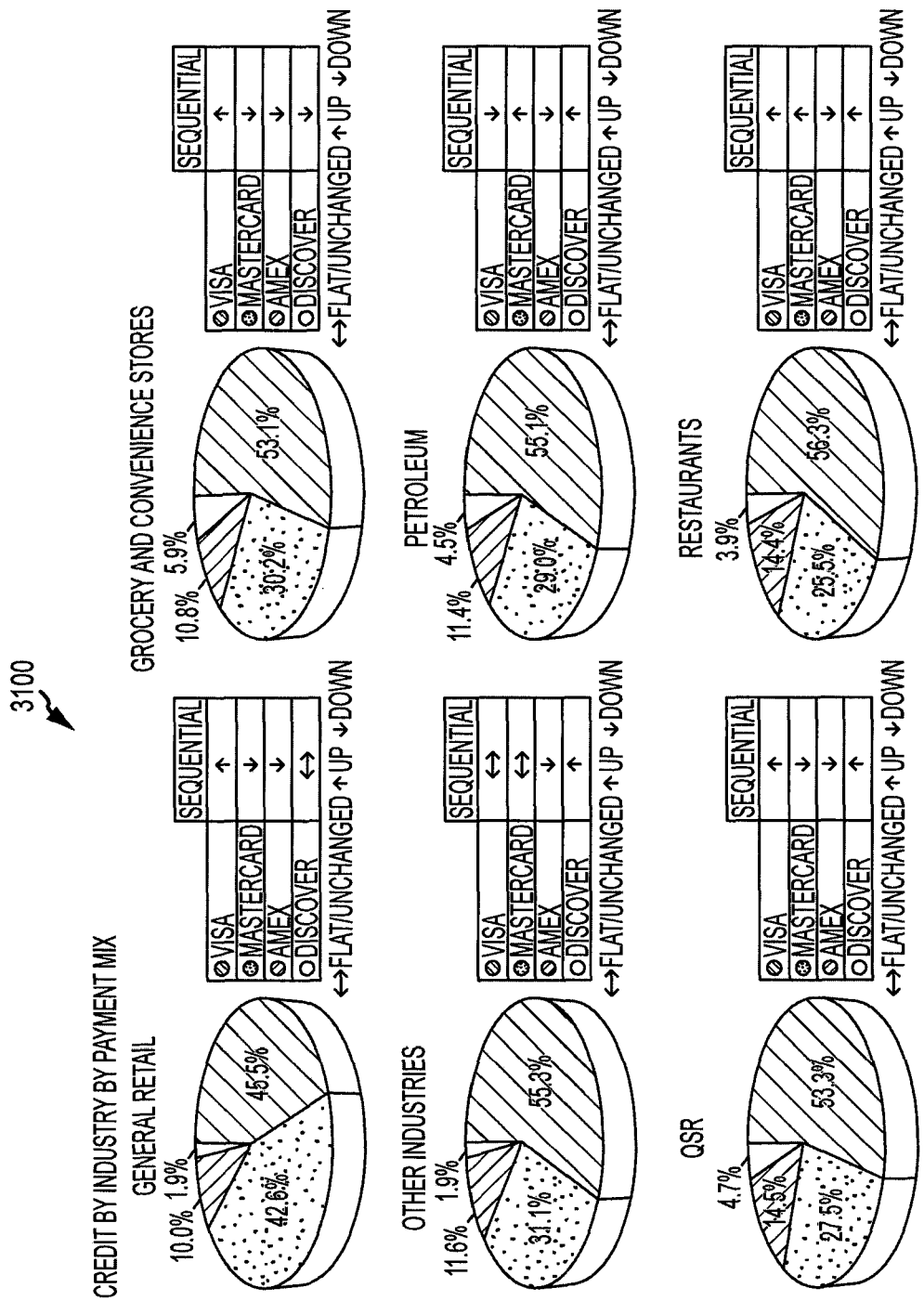
FIG. 31 illustrates a report showing credit transactions according to payment network and by industry.

FIG. 30 illustrates a report 3000 that is similar to report 2900 except shown for signature debit transactions. FIG. 31 illustrates a report 3100 that is similar to report 2900 except shown for credit transactions.

Hence, a wide variety of reports may be generated based on the aggregated point of sale data based on a variety of categories, such as payment instrument type, payment network type, geographic region, industry type and the like. To produce these reports, payment instrument types and payment network types may be determined from the point of sale transaction data, which typically includes the payment instrument or payment account number that can be used to identify the payment instrument type. For example, a credit card number may have relevant digits, such as a BIN number, that may be used to identify that it is a credit card account. Information on the payment network may be obtained based on how the transaction is routed to the particular payment processing network. More specifically, the settled transaction file for each transaction includes an identifier that indicates which processing network settled the transaction. The geographical region may be determined from the merchant identifier similar to other embodiments described herein. Further, the industry classification may be determined based on a variety of factors, such as merchant classification codes or other industry classification codes as is known in the art. It will further be appreciated that information from any of the other reports described in the incorporated by reference may be included with any of the reports described herein.

Although not shown in the reports of FIGS. 11-36, it will be appreciated that the payment types could be expanded to include payment types such as those originating from mobile transactions or ecommerce transactions. These could be displayed by industry or geographic region. Further, various filtering of the payment transaction types could occur similar to other embodiments.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added, and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for market reporting according to point-of-sale (POS) data, the system comprising:
    an aggregation subsystem, communicatively coupled with a POS network comprising a plurality of POS terminals, and configured to aggregate POS datasets from the plurality of POS terminals in the POS network, each POS terminal being disposed at a merchant associated with terminal data indicating at least one merchant classifier, and each POS terminal being configured to collect transaction data as a function of transactions effectuated via the POS terminal, wherein the transaction data comprises a time of the transaction, an amount of the transaction and an account identifier used to pay for the transaction, and each transaction being routed over one of a plurality of payment networks, each payment network being associated with payment network data, the POS dataset for each of the POS terminals comprising the terminal data, the payment network data and the transaction data;
    a data storage subsystem, communicatively coupled with the aggregation subsystem and configured to store the aggregated POS data from the plurality of POS terminals in the POS network;
    a trend processing subsystem, communicatively coupled with the POS data store, and configured to generate a market trend for a designated payment type over a timeframe by:
        identifying a payment type dataset from the aggregated POS data, the payment type dataset comprising the POS datasets corresponding to the timeframe and to transactions categorized by payment type; and
        generating the market trend as a function of the payment type dataset; and
    a reporting subsystem, communicatively coupled with the trend processing subsystem, and configured to output graphical report data as a function of the market trend generated by the trend processing system, the graphical report data configured to be displayed on a user device.

2. A system as in claim 1, wherein the reporting subsystem further configures the graphical report data to permit the display of the percentage of transactions for each payment type in terms of numbers of transactions.

3. A system as in claim 2, wherein the reporting subsystem further configures the graphical report data to permit the display of whether each payment type is increasing or decreasing in numbers of transactions over the timeframe.

4. A system as in claim 1, wherein the reporting subsystem further configures the graphical report data to permit the display of the percentage of transactions for each payment type in terms of dollar volumes over the timeframe.

5. A system as in claim 4, wherein the reporting subsystem further configures the graphical report data to permit the display of whether each payment type is increasing or decreasing in dollar volumes over the timeframe.

6. A system as in claim 1, wherein the payment type dataset comprises PIN debit transactions, and wherein the reporting subsystem further configures the graphical report data to permit the display of the percentage of the number of PIN debit transactions that occurred with each payment network.

7. A system as in claim 6, wherein the reporting subsystem further configures the graphical report data to permit the display of whether each payment network is increasing or decreasing in numbers of transactions over the timeframe.

8. A system as in claim 1, wherein the payment type dataset comprises PIN debit transactions, and wherein the reporting subsystem further configures the graphical report data to permit the display of transaction growth and dollar volume growth for each payment network over the time frame.

9. A system as in claim 1, wherein the payment type dataset comprises PIN debit transactions, wherein the given market comprises one or more geographical regions, and wherein the reporting subsystem further configures the graphical report data to permit the display of the percentage of transactions in different geographical regions where the POS terminals are located.

10. A system as in claim 1, wherein the payment type dataset comprises PIN debit transactions, wherein the given market comprises one or more industry classifications based on the merchant classifiers, and wherein the reporting subsystem further configures the graphical report data to permit the display of the percentage of transactions in different industry classifications according to payment network.

11. A system as in claim 1, wherein the payment type dataset comprises PIN debit transactions, and wherein the reporting subsystem further configures the graphical report data to permit the display of the percentage of the dollar volume of PIN debit transactions that occurred with each payment network.

12. A system as in claim 11, wherein the reporting subsystem further configures the graphical report data to permit the display of whether each payment network is increasing or decreasing in dollar volumes of transactions over the timeframe.

13. A system as in claim 1, wherein the payment type dataset comprises signature debit transactions, and wherein the reporting subsystem further configures the graphical report data to permit the display of the percentage of the number of signature debit transactions that occurred with each payment network.

14. A system as in claim 13, wherein the reporting subsystem further configures the graphical report data to permit the display of whether each payment network is increasing or decreasing in numbers of transactions over the timeframe.

15. A system as in claim 1, wherein the payment type dataset comprises signature debit transactions, and wherein the reporting subsystem further configures the graphical report data to permit the display of transaction growth and dollar volume growth for each payment network over the time frame.

16. A system as in claim 1, wherein the payment type dataset comprises signature debit transactions, and wherein the reporting subsystem further configures the graphical report data to permit the display of the percentage of the dollar volume of signature debit transactions that occurred with each payment network.

17. A system as in claim 16, wherein the reporting subsystem further configures the graphical report data to permit the display of whether each payment network is increasing or decreasing in dollar volumes of transactions over the timeframe.

18. A system as in claim 1, wherein the payment type dataset comprises credit transactions, and wherein the reporting subsystem further configures the graphical report data to permit the display of the percentage of the number of credit transactions that occurred with each payment network.

19. A system as in claim 18, wherein the reporting subsystem further configures the graphical report data to permit the display of whether each payment network is increasing or decreasing in numbers of transactions over the timeframe.

20. A system as in claim 1, wherein the payment type dataset comprises credit transactions, and wherein the reporting subsystem further configures the graphical report data to permit the display of transaction growth and dollar volume growth for each payment network over the time frame.

21. A system as in claim 1, wherein the payment type dataset comprises credit transactions, and wherein the reporting subsystem further configures the graphical report data to permit the display of the percentage of the dollar volume of credit transactions that occurred with each payment network.

22. A system as in claim 21, wherein the reporting subsystem further configures the graphical report data to permit the display of whether each payment network is increasing or decreasing in dollar volumes of transactions over the timeframe.

23. A method for market reporting according to point-of-sale (POS) data, the method comprising:
aggregating POS datasets from a plurality of POS terminals in a POS network, each POS terminal being disposed at a merchant associated with terminal data indicating at least one merchant identifier and at least one merchant classifier, and each POS terminal being configured to collect transaction data as a function of transactions effectuated via the POS terminal, wherein the transaction data comprises a time of the transaction, an amount of the transaction and an account identifier used to pay for the transaction, and each transaction being routed over one of a plurality of payment networks, each payment network being associated with payment network data, the POS dataset for each of the POS terminals comprising the terminal data, the payment network data and the transaction data receiving a reporting request for a market trend report corresponding to a designated payment type over a designated timeframe;

identifying a payment type dataset from the aggregated POS data, the payment type dataset comprising the POS datasets corresponding to the timeframe and to transactions categorized by payment type;

generating market trend data as a function of the payment type dataset; and outputting graphical report data as a function of the market trend data in response to the reporting request.

24. A method as in claim 23, wherein the graphical report data permits the display of the percentage of transactions for each payment type in terms of numbers of transactions.

25. A method as in claim 24, wherein the graphical report data permits the display of whether each payment type is increasing or decreasing in numbers of transactions over the timeframe.

26. A method as in claim 23, wherein the graphical report data permits the display of the percentage of transactions for each payment type in terms of dollar volumes over the timeframe.

27. A method as in claim 26, wherein the graphical report data permits the display of whether each payment type is increasing or decreasing in dollar volumes over the timeframe.

28. A method as in claim 23, wherein the payment type dataset comprises PIN debit transactions, and wherein the graphical report data permits the display of the percentage of the number of PIN debit transactions that occurred with each payment network.

29. A method as in claim 28, wherein the graphical report data permits the display of whether each payment network is increasing or decreasing in numbers of transactions over the timeframe.

30. A method as in claim 23, wherein the payment type dataset comprises PIN debit transactions, and wherein the graphical report data permits the display of transaction growth and dollar volume growth for each payment network over the time frame.

31. A method as in claim 23, wherein the payment type dataset comprises PIN debit transactions, wherein the given market comprises one or more geographical regions, and wherein the graphical report data permits the display of the percentage of transactions in different geographical regions where the POS terminals are located.

32. A method as in claim 23, wherein the payment type dataset comprises PIN debit transactions, wherein the given market comprises one or more industry classifications based on the merchant classifiers, and wherein the graphical report data permits the display of the percentage of transactions in different industry classifications according to payment network.

33. A method as in claim 23, wherein the payment type dataset comprises PIN debit transactions, and wherein the graphical report data permits the display of the percentage of the dollar volume of PIN debit transactions that occurred with each payment network.

34. A method as in claim 33, wherein the graphical report data permits the display of whether each payment network is increasing or decreasing in dollar volumes of transactions over the timeframe.

35. A method as in claim 23, wherein the payment type dataset comprises signature debit transactions, and wherein the graphical report data permits the display of the percentage of the number of signature debit transactions that occurred with each payment network.

36. A method as in claim 35, wherein the graphical report data permits the display of whether each payment network is increasing or decreasing in numbers of transactions over the timeframe.

37. A method as in claim 23, wherein the payment type dataset comprises signature debit transactions, and wherein the graphical report data permits the display of transaction growth and dollar volume growth for each payment network over the time frame.

38. A method as in claim 23, wherein the payment type dataset comprises signature debit transactions, and wherein the graphical report data permits the display of the percentage of the dollar volume of signature debit transactions that occurred with each payment network.

39. A method as in claim 38, wherein the graphical report data permits the display of whether each payment network is increasing or decreasing in dollar volumes of transactions over the timeframe.

40. A method as in claim 23, wherein the payment type dataset comprises credit transactions, and wherein the graphical report data permits the display of the percentage of the number of credit transactions that occurred with each payment network.

41. A method as in claim 40, wherein the graphical report data permits the display of whether each payment network is increasing or decreasing in numbers of transactions over the timeframe.

42. A method as in claim 23, wherein the payment type dataset comprises credit transactions, and wherein the graphical report data permits the display of transaction growth and dollar volume growth for each payment network over the time frame.

43. A method as in claim 23, wherein the payment type dataset comprises credit transactions, and wherein the graphical report data permits the display of the percentage of the dollar volume of credit transactions that occurred with each payment network.

44. A method as in claim 43, wherein the graphical report data permits the display of whether each payment network is increasing or decreasing in dollar volumes of transactions over the timeframe.

* * * * *